United States Patent [19]

Fischer

[11] Patent Number: 5,048,014

[45] Date of Patent: Sep. 10, 1991

[54] DYNAMIC NETWORK RECONFIGURATION TECHNIQUE FOR DIRECTED-TOKEN EXPANDED-ADDRESS LAN

[75] Inventor: Michael A. Fischer, San Antonio, Tex.

[73] Assignee: Datapoint Corporation, San Antonio, Tex.

[21] Appl. No.: 560,002

[22] Filed: Jul. 24, 1990

Related U.S. Application Data

[63] Continuation of Ser. No. 292,467, Dec. 30, 1988, abandoned, which is a continuation-in-part of Ser. No. 270,641, Nov. 14, 1988, abandoned, and a continuation-in-part of Ser. No. 270,804, Nov. 14, 1988, abandoned.

[51] Int. Cl.⁵ ............................................. H04J 3/14
[52] U.S. Cl. ................................. 370/85.5; 370/85.4; 370/85.6
[58] Field of Search ................. 370/85.4, 85.5, 85.6; 340/825.5, 825.51, 825.05

[56] References Cited

U.S. PATENT DOCUMENTS

| | | | |
|---|---|---|---|
| 3,087,065 | 4/1963 | Mutschler | 370/1 |
| 3,337,691 | 8/1967 | Litchman | 370/112 |
| 3,482,101 | 12/1969 | Slaymaker | 364/485 |
| 3,532,890 | 10/1970 | Denton | 370/2 |
| 3,571,756 | 3/1971 | Skoog et al. | 332/116 |
| 3,621,139 | 11/1971 | Gibson | 375/101 |
| 3,689,699 | 9/1972 | Brenig et al. | 370/105 |
| 3,733,550 | 5/1973 | Tazaki et al. | 375/17 |
| 3,755,676 | 8/1973 | Kinsel | 370/1 |
| 3,775,688 | 11/1973 | Hinoshita et al. | 325/42 |
| 3,851,252 | 11/1974 | Karnaugh et al. | 375/24 |
| 3,897,887 | 8/1975 | Goldberg | 222/26 |
| 3,979,561 | 9/1976 | Hinkle et al. | 370/77 |
| 3,985,423 | 10/1976 | Tseng | 350/96.13 |
| 4,062,618 | 12/1977 | Steensma | 350/3.68 |
| 4,101,734 | 7/1978 | Dao | 375/17 |
| 4,161,628 | 7/1979 | McRae | 370/17 |
| 4,206,320 | 6/1980 | Keasler et al. | 370/11 |

(List continued on next page.)

OTHER PUBLICATIONS

Abandoned, Ser. No. 466,075 filed 2/14/83.
Excerpt of Chapter 2 from "A Commonsense Approach to the Theory of Error Correcting Codes", Benjamin Arazi, The MIT Press, 1988.
Excerpt from "Error Detecting Codes, Self-Checking Circuits and Applications", by John Wakerly, 1982.
Excerpt of "Microcomputer Interfacing", by Harold S. Stone, 1983.
Excerpt from "Circuits and Application Seminar", by Fairchild pertaining to Data Synchronizer, published 1982.
Article, "Designers Confront Metastability in Boards and Buses", by John Beaston and R. Scott Tetrick, *Computer Design*, Mar. 1, 1986.

*Primary Examiner*—Douglas W. Olms
*Assistant Examiner*—Min Jung
*Attorney, Agent, or Firm*—John R. Ley

[57] ABSTRACT

Additional nodes beyond those permitted by the size of the address field of a standard network operating protocol, may be added to a directed token LAN, and the added nodes may be automatically and dynamically configured or reconfigured into a token passing loop. The added nodes, referred to as enhanced nodes, interoperably combine a standard reconfiguration sequence of a standard network operational protocol with an enhanced reconfiguration sequence of an enhanced protocol in order to send tokens to establish the next active nodes of the network and thereby establish the token passing loop through all of the standard and enhanced nodes.

54 Claims, 13 Drawing Sheets

U.S. PATENT DOCUMENTS

| | | | |
|---|---|---|---|
| 4,258,433 | 3/1981 | Herschtal et al. | 370/24 |
| 4,326,289 | 4/1982 | Dickinson | 370/85.8 |
| 4,339,818 | 7/1982 | Gruenberg | 370/112 |
| 4,348,075 | 9/1982 | Gottlieb et al. | 350/96.13 |
| 4,386,323 | 5/1983 | Jansen | 328/63 |
| 4,451,827 | 5/1984 | Kahn et al. | 340/825.52 |
| 4,534,040 | 8/1985 | Thapar | 375/39 |
| 4,575,860 | 3/1986 | Scordo | 375/110 |
| 4,599,732 | 7/1986 | LeFever | 375/13 |
| 4,602,365 | 7/1986 | White et al. | 370/85.5 |
| 4,649,535 | 3/1987 | Ulug | 370/85.4 |
| 4,675,671 | 6/1987 | Ishizuka et al. | 340/825.05 |
| 4,675,880 | 6/1987 | Davarian | 375/39 |
| 4,700,185 | 10/1987 | Balph et al. | 340/825.06 |
| 4,701,908 | 10/1987 | Ikeda | 370/85.4 |
| 4,713,817 | 12/1987 | Wei | 371/43 |
| 4,752,924 | 6/1988 | Darnell et al. | 370/85.15 |
| 4,756,007 | 7/1988 | Qureshi et al. | 375/37 |
| 4,757,497 | 7/1988 | Beierle et al. | 370/85.12 |
| 4,771,286 | 9/1988 | Niessen et al. | 340/825.52 |
| 4,780,889 | 10/1988 | Ley et al. | 375/110 |
| 4,782,482 | 11/1988 | Kiatipor et al. | 370/85.15 |
| 4,789,982 | 12/1988 | Coden | 370/85.5 |
| 4,792,944 | 12/1988 | Takahashi et al. | 370/84 |
| 4,797,879 | 1/1989 | Habbab et al. | 370/3 |
| 4,821,296 | 4/1989 | Cordell | 375/119 |
| 4,841,551 | 6/1989 | Avaneas | 375/118 |
| 4,855,997 | 8/1989 | Wilson et al. | 370/85.1 |
| 4,896,338 | 1/1990 | Rouillet et al. | 375/119 |
| 4,907,224 | 3/1990 | Scoles et al. | 370/85.2 |
| 4,979,167 | 12/1990 | McCool | 370/85.4 |

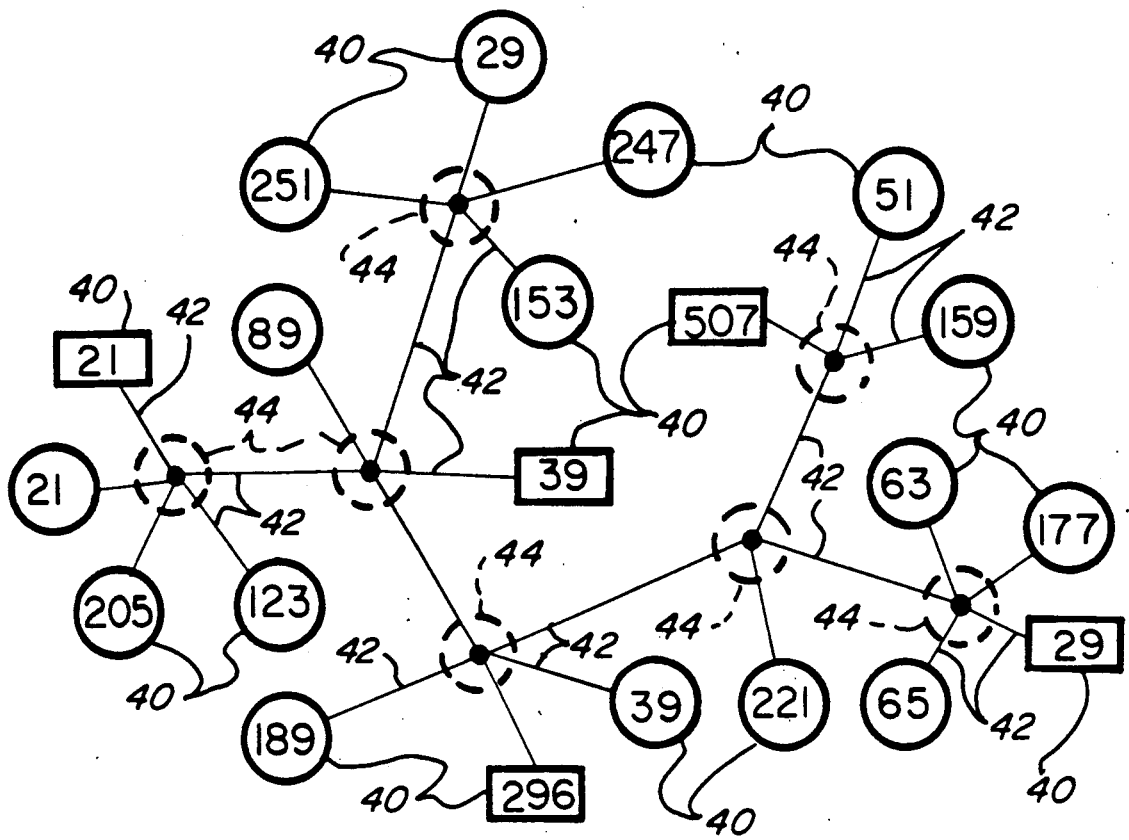
Fig_1
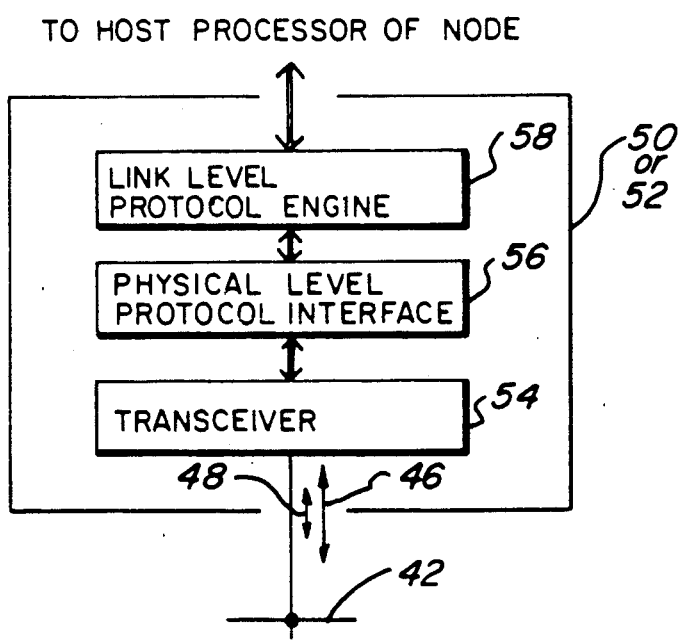
Fig_3

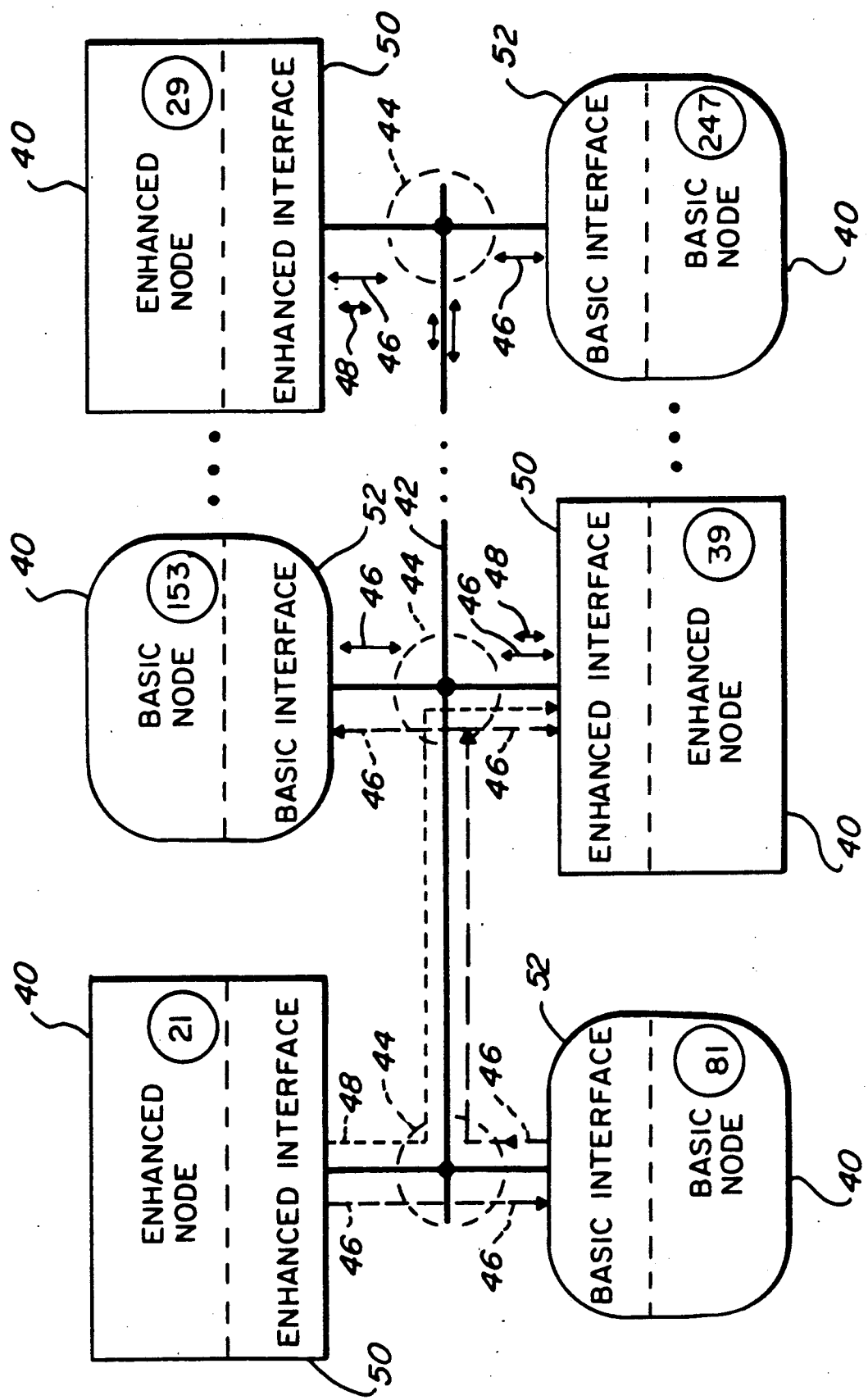
Fig_2

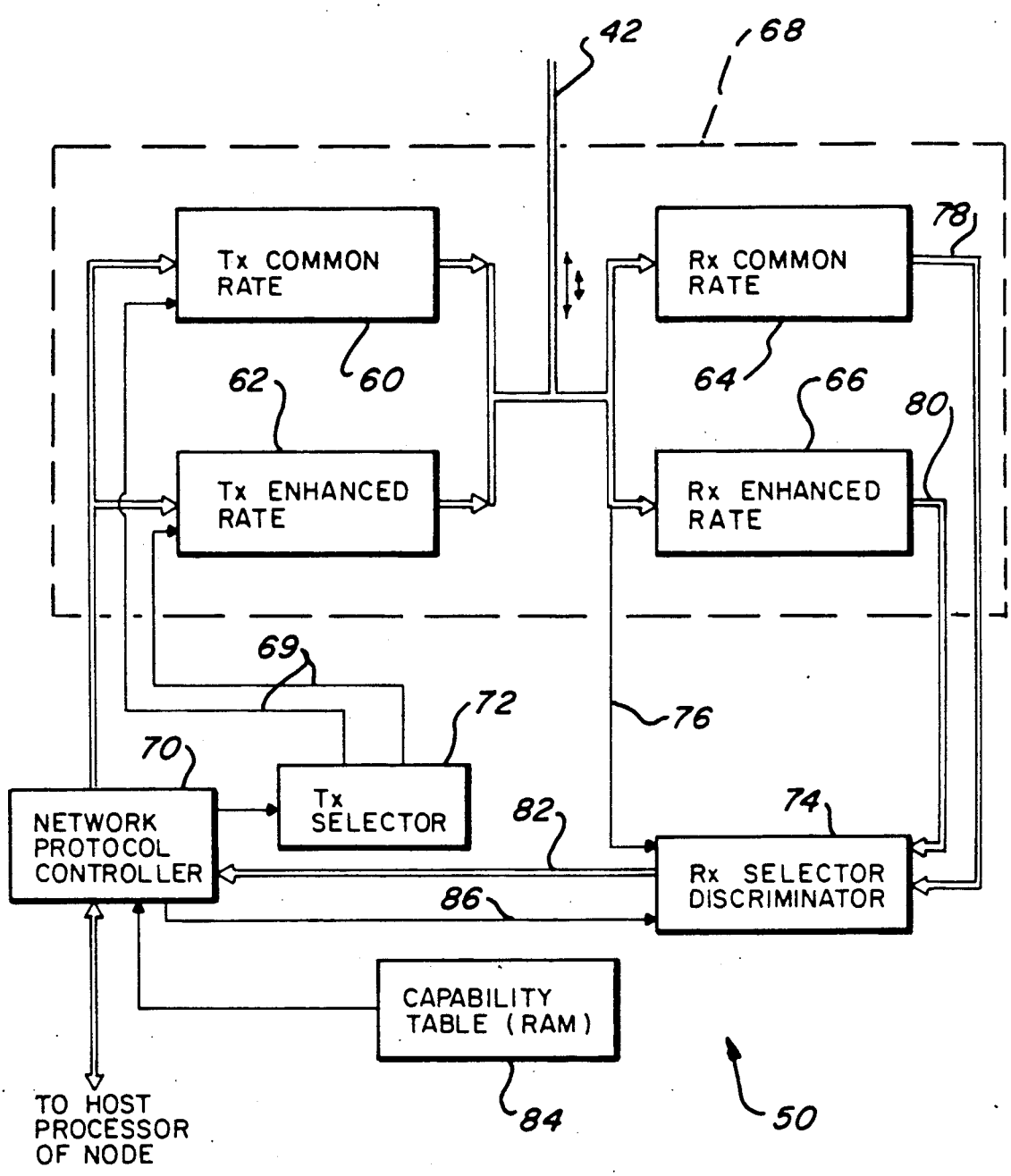
Fig_4

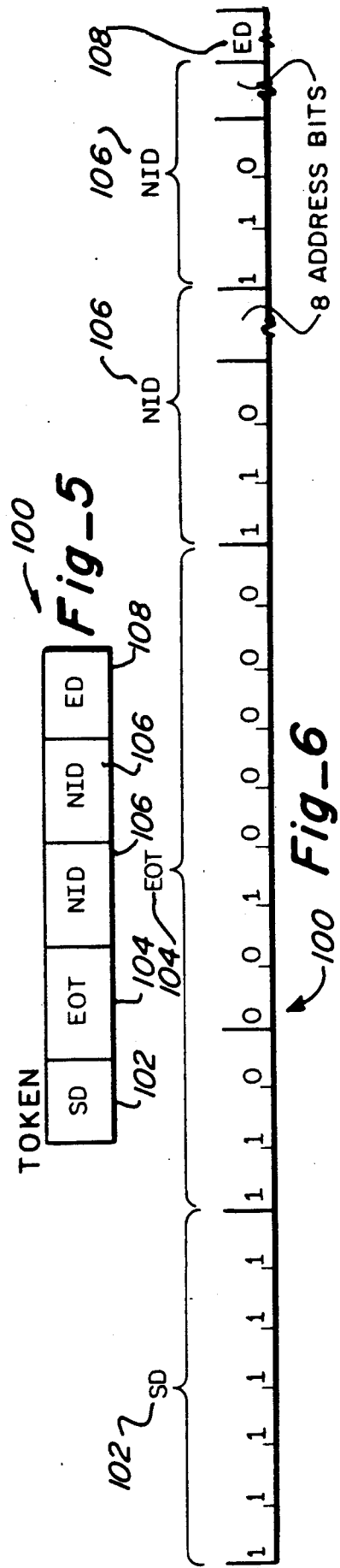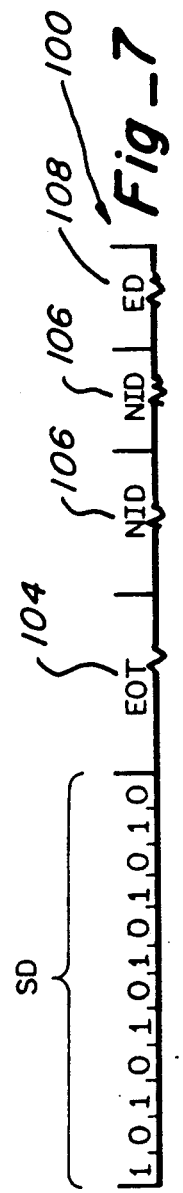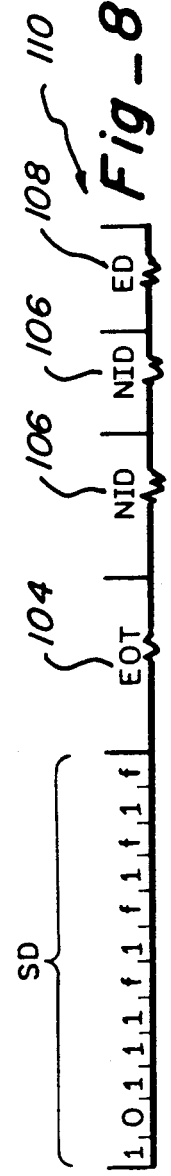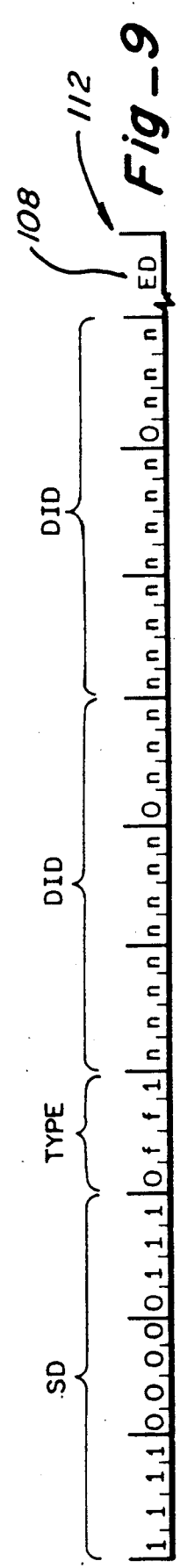

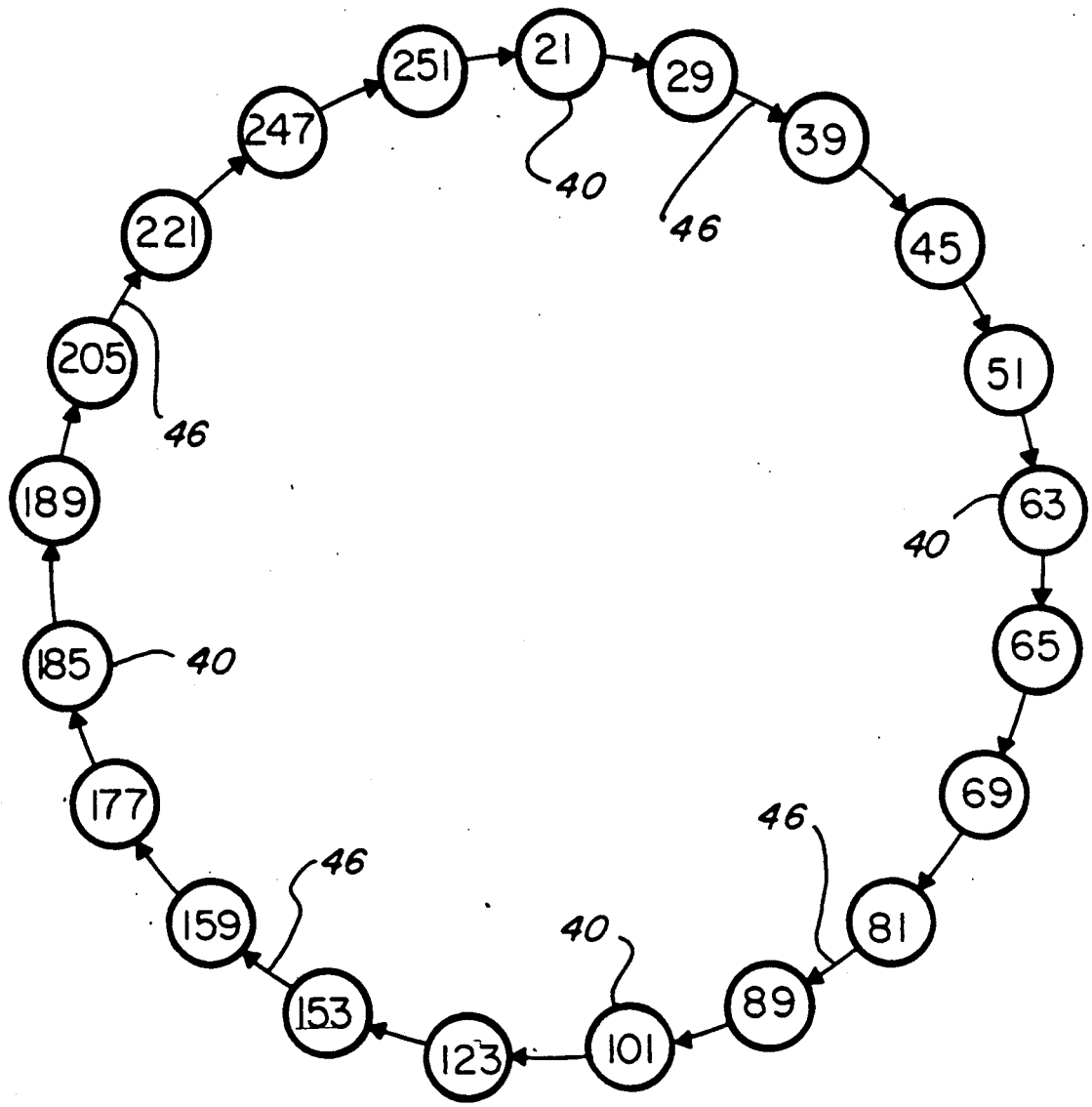
Fig_10
PRIOR ART

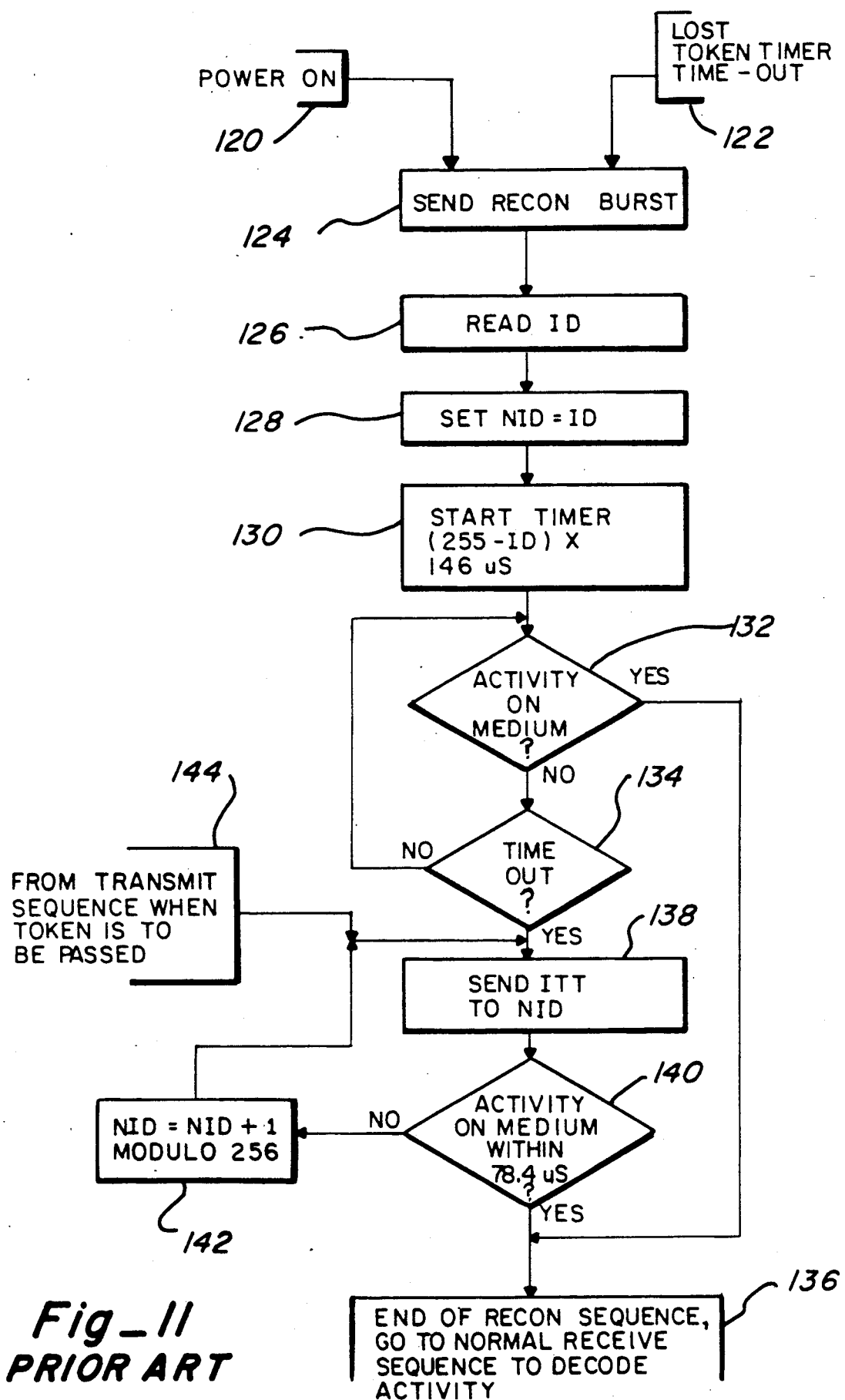
Fig_11
PRIOR ART

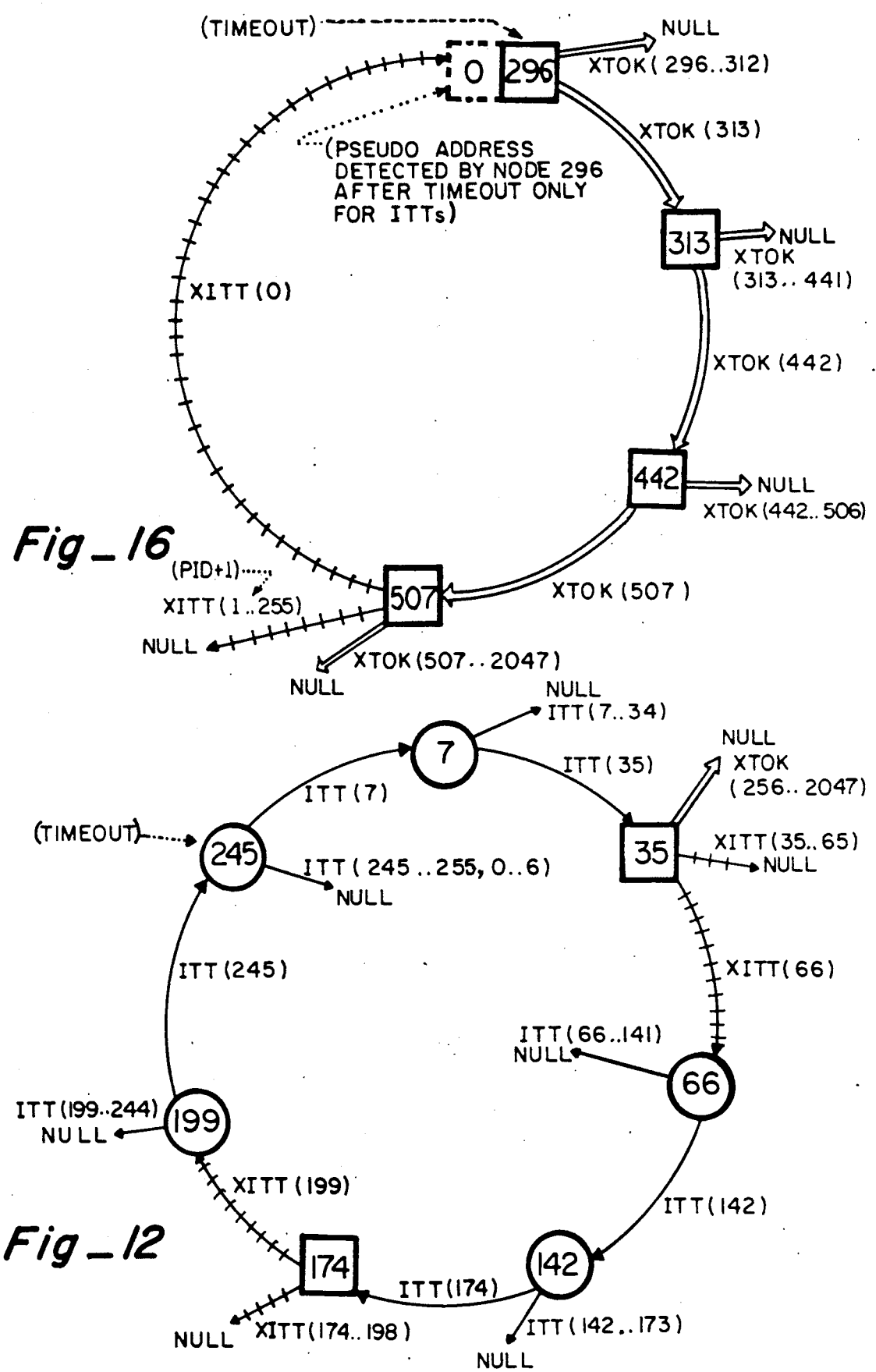
Fig_16
Fig_12

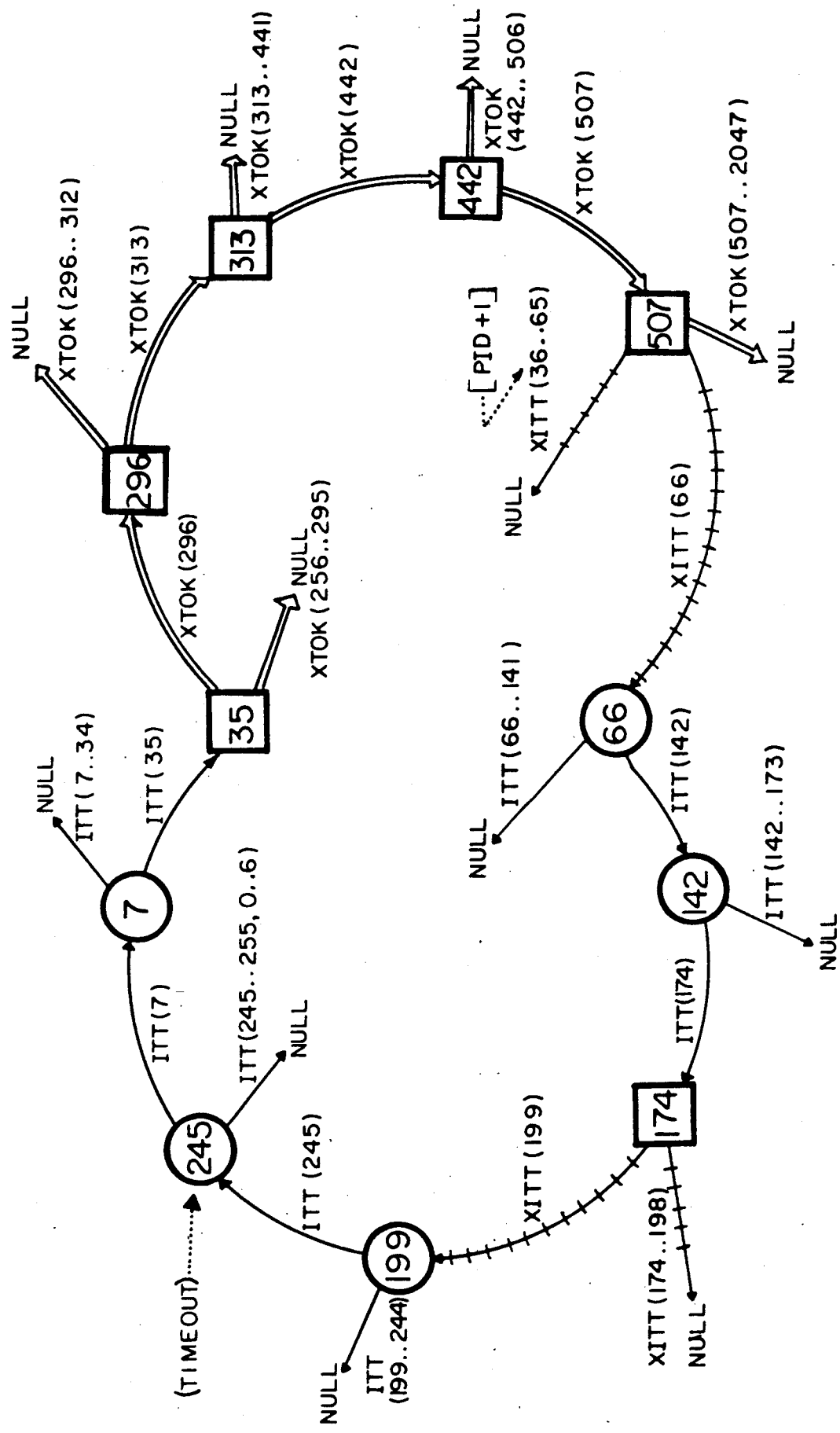
Fig_13

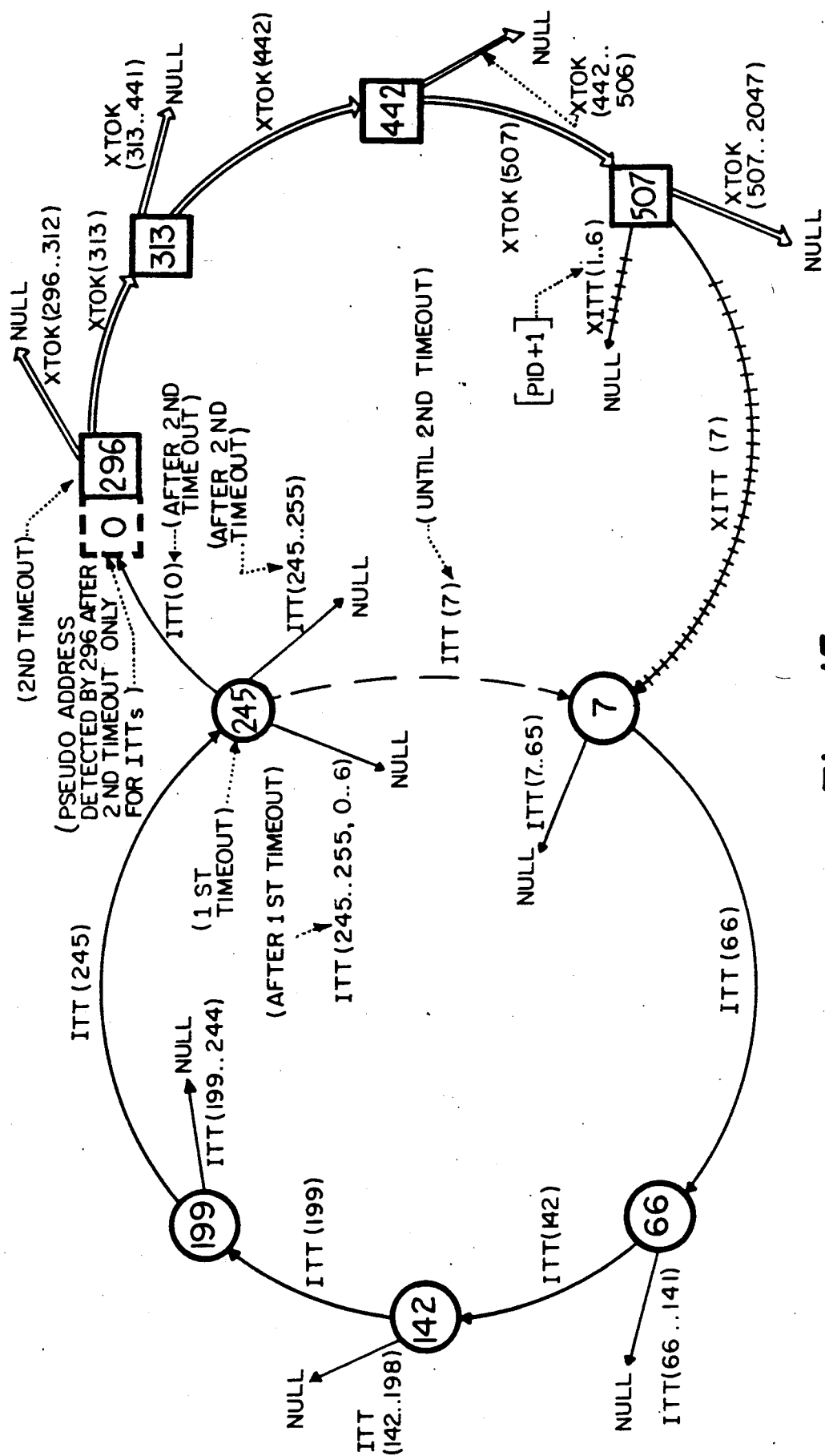
Fig_15

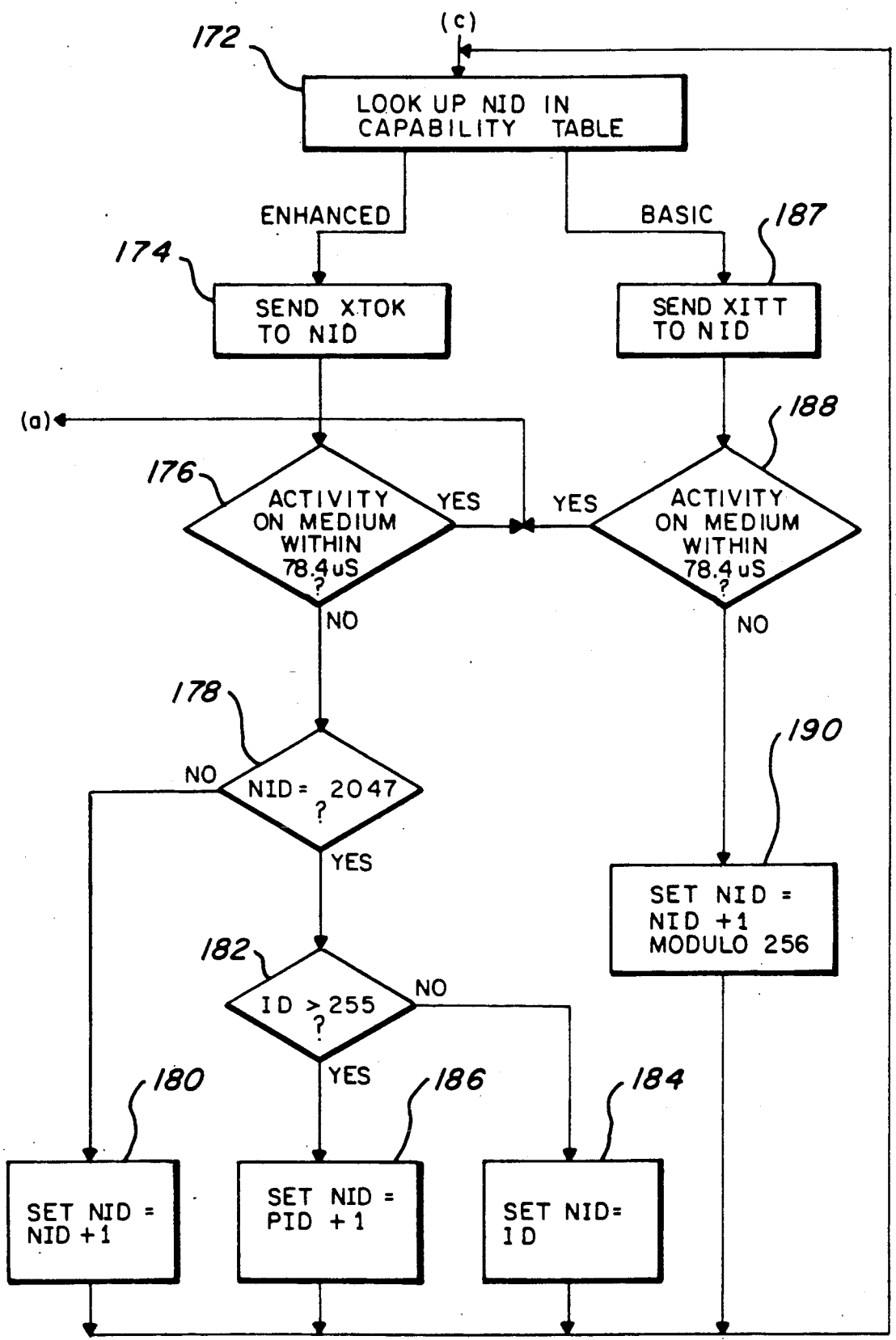
Fig_17B

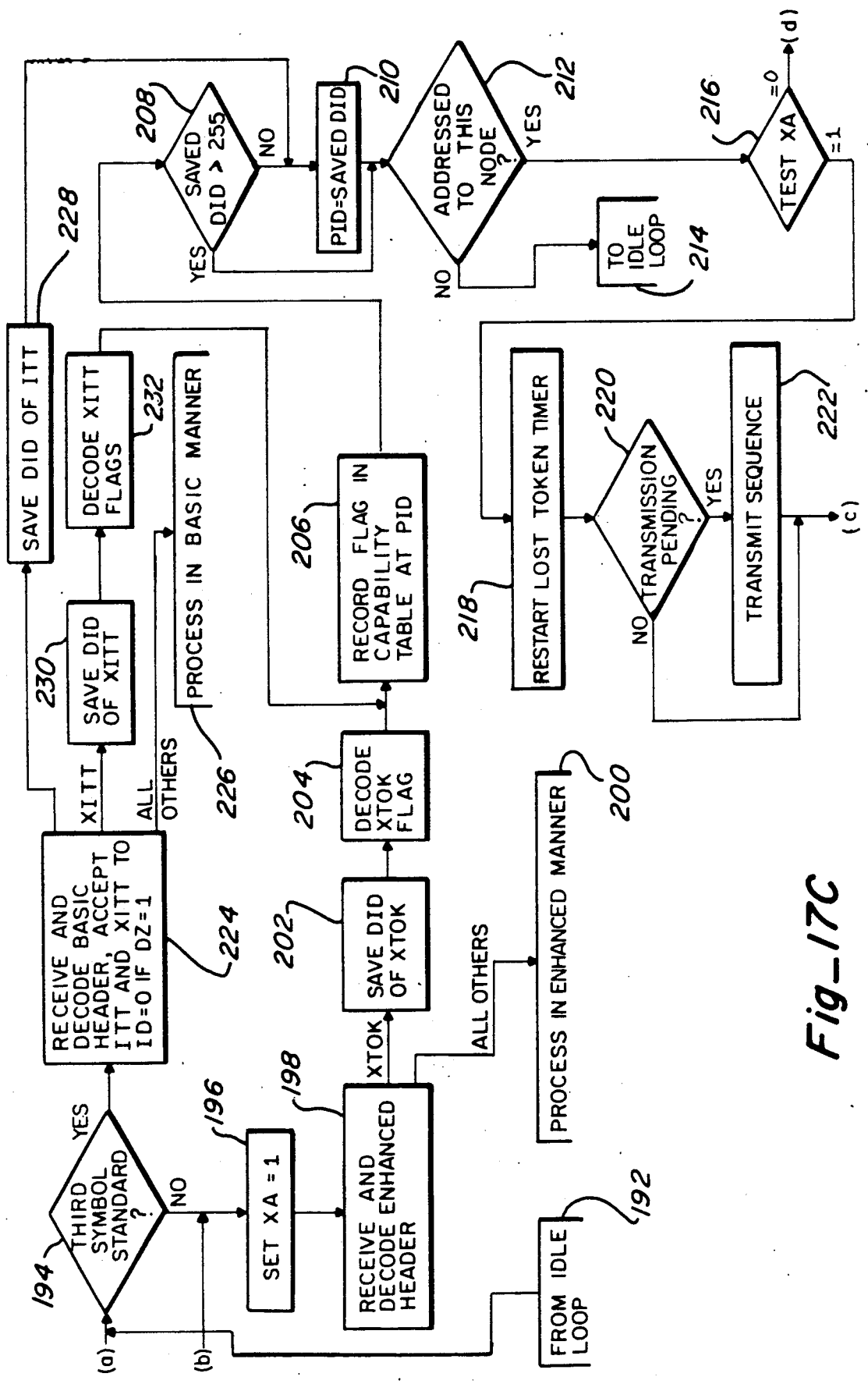
Fig_17C

DYNAMIC NETWORK RECONFIGURATION TECHNIQUE FOR DIRECTED-TOKEN EXPANDED-ADDRESS LAN

CROSS REFERENCE TO RELATED APPLICATIONS

This is a continuation of U.S. patent application Ser. No. 292,467, now abandoned, filed Dec. 30, 1988, which is a continuation-in-part of U.S. patent applications for LAN WITH INTEROPERATIVE MULTIPLE OPERATIONAL CAPABILITIES, Ser. No. 270,641, now abandoned, and LAN WITH DYNAMICALLY SELECTABLE MULTIPLE OPERATIONAL CAPABILITIES, Ser. No. 270,804, now abandoned, both filed Nov. 14, 1988, and assigned to the assignee hereof. The disclosures of these two applications are incorporated herein by this reference. This application also relates to the inventions disclosed in U.S. patent applications for MULTIBIT AMPLITUDE AND PHASE MODULATION TRANSCEIVER FOR LAN, Ser. No. 270,739, filed Nov. 14, 1988, and UNEVEN TOKEN DISTRIBUTION TECHNIQUE FOR TOKEN BASED LOCAL AREA NETWORK, Ser. No. 154,970, filed Feb. 11, 1988, and now U.S. Pat. No. 5,001,472. The disclosures of both of these applications are also incorporated herein by this reference.

BACKGROUND OF THE INVENTION

The present invention relates to a dynamically self-configuring, directed token passing local area network. A local area network is referred to herein as "LAN" or "network". More particularly, the present invention pertains to improvements in such LANs which increase the logical limit of the number of nodes which can be operative on the network, and which allow all of the nodes, including additional nodes, to be established in a token passing loop, on a self-configuring and dynamic basis.

In general, a LAN is a communication medium and means by which a relatively large number of relatively closely physically located processor-based communications devices can send and receive message communications. The medium usually includes electrical or optical cables, but may also include radio or open-air optical links over which signals are conducted. Each communication device and its interconnection to the medium is referred to as a "node". Messages are communicated by transmitting patterns of signal elements, known as frames, between nodes. Each node of the LAN has its own unique adress or identification (ID). Typically, a frame includes address information of the transmitting or source node, known as the source ID or SID, and address information of the destination node to which the frame is addressed, known as the destination ID or DID. The transmitted frames are disregarded by all nodes except the destination node, but each node decodes the DID of the frame to the extent necessary to determine whether the frame is addressed to it.

Access to the LAN medium is controlled to assure that only one message is properly communicated at a time, thereby preventing two or more nodes from simultaneously transmitting frames and interferring with one another and with the proper operation of the LAN. One widely used technique of medium access control involves a "token". A token is a frame which is addressed to a specific destination node and which, upon receipt at the destination node, allows that node to have the exclusive right to initiate a message communication over the medium. The operational protocol of the LAN permits only the node in receipt of the token to initiate the message communication. Since the LAN typically uses only one token, there is no interference resulting from the simultaneous initiation of multiple message communications because only the node in receipt of the token can initiate message communications.

The operational protocol of the LAN causes the token to be passed among all of the active nodes in a regular, complete and even rotational pattern or sequence, called a "token loop" or a "token passing loop". The token loop allows each active node to have equal access to the medium for initiating message communications. Each active node receives the token in its turn in the token loop, regardless of whether or not that node has a message communication to initiate. If the node has a message communication to initiate, it does so after receipt of the token, and then passes the token to the next node in the loop after communication of the message has been completed. If the node does not have a message communication to initiate, the token is immediately passed to the next node in the token loop.

Another type of LAN access control is contention arbitration or Carrier-Sense Multiple Access (predominantly CSMA/CD). With contention arbitration only those nodes which have messages to communicate vie for access to the LAN medium. When a node with a message to communicate detects that no other message communication is in progress over the medium, it initiates the message communication. So long as no other node also initiates a message simultaneously, the node which is first in time receives exclusive access to the LAN medium for the duration of its message. If two or more nodes initiate message communications simultaneously, a collision of the transmitted signals occurs and prevents the colliding messages from being correctly delivered. Collisions necessitate subsequent re-transmissions of the collided message communications. Thus, in contention arbitrated LANs, each node must contend with all other nodes for access to the LAN medium. Contention-type LANs are not pertinent to the present invention, because contention-type LANs do not utilize tokens and the present invention pertains to token based LANs.

LANs can further be distinguished by the signal connectivity or signal transmission patterns. Bus-type LANs connect all nodes to a single common logical or electrical point, although the single common point may be physically dispersed over a large number of locations. Bus-type LANs send signals directly from the source node to the destination node, through the common connection point. The transmitted signals from any node are received about simultaneously by all the other nodes and are disregarded by all of the nodes except the destination node. Since all signals are transmitted and received through a common connection point, the communication path between all the nodes of a bus-type LAN is bi-directional, usually half-duplex.

Ring-type LANs have all of their nodes physically connected in a serial loop or ring. Each node always transmits to its neighboring node in the ring and receives from its other neighboring node in the ring. All the nodes in the ring serially pass the uni-directional transmissions from one to another in this ring. The signals are sent through every intervening connected node in the ring between the source node and the destination node. All of the nodes operate in synchronism, with each node receiving and re-transmitting the signal. The address information contained within the transmission causes only the destination node to utilize the information, while the other nodes simply pass the message on to their neighboring nodes in the ring. Thus, all transmissions in a ring-type LAN circulate in an unalterable, predefined, unidirectional signal path through all of the nodes around the ring. When tokens are employed in a ring-type LAN, the tokens are also passed in a logical sequence which is the same as the unalterable ring-like physical path.

The concept of "directed-token" applies to networks where the recipient of a token is determined by a destination address or DID in the token frame. A directed token approach is primarily used on token bus networks, where there is a logical token passing loop operating on a physical bus. This technique can also be used on other broadcast-media networks such as radio-frequency or free-air optical links. In contrast, token passing on token-based ring networks is not of the "directed-token" variety, because the token is passed by the physical transmission of the token frame from one node to the next adjacent node in the ring. The sequence of token passing on a ring is the physical connection order of nodes in the ring. As a result, token frames on token-based rings generally do not include a destination address. Bus-structured networks and broadcast-media networks do not have a physical means of designating the destination of a token pass and therefore incorporate a destination address in each token. In general, the improvements of the present invention are not readily applicable to token-based ring LANs.

In some situations it becomes desirable to connect a large number of nodes to the LAN. The maximum number of nodes on a LAN is due to either physical or logical restrictions. The physical restrictions pertain to electrical and/or cabling limits, as required by or for signal propagation and decay. The logical restrictions relate to how many nodes may be addressed in the node addressing scheme of the LAN operational protocol. As a physical restriction, a LAN bus which is wired as a single multi-drop cable is limited in the number of drops which may be installed on a cable segment, but a LAN bus which is wired as an unrooted tree has little or no practical limit on the physical number of nodes that may be attached, other than as is limited by the maximum end-to-end signal propagation delays which can be tolerated by the network operating protocol. A ring network has a physical limit on the number of allowed nodes based upon the maximum amount of synchronization fluctuation or clock "jitter" that is acceptable for the data recovery circuits of the node receivers. A small amount of time-base clock jitter accumulates at each node of the ring, which causes a practical limit on the number of nodes on the ring.

As a logical restriction, IEEE 802.3-type bus networks (e.g., contention arbitrated) are not practically limited in the logical number of nodes, since their address fields are 48 bits long, permitting roughly 144 trillion distinct node addresses. On the other hand, most non-IEEE 802 bus networks use address fields in the frames that are only 8 bits long. An 8-bit length of the address field limits the number of nodes and addresses to no more than 255, since each node requires its own separate address. Increasing the size of the address field to accommodate more than 255 nodes might be possible, but the network operating protocol will usually not accommodate expanded address fields.

Increasing the size of a directed token passing network by adding more nodes and expanding the address field without replacing the pre-existing nodes is not a complete solution to expanding the size of the network, because the network operating protocol does not allow the additional nodes at the expanded addresses to be dynamically configured or reconfigured in the token passing loop. Reconfiguration, as explained in greater detail below, is that process whereby all the active nodes are automatically and dynamically established in the token passing loop. The reconfiguration sequence under the standard or basic network operating protocol is effective only as to the nodes in the basic range of standard addresses and not to additional nodes in an extended or expanded range of addresses. All of the active nodes must be included in the token loop for the network to function properly. Replacing numerous pre-existing nodes in order to use expanded address space is economically unattractive.

Accommodating the basic network operating protocol for reconfiguration while still incorporating in the reconfiguration sequence those additional nodes at an expanded range of addresses beyond the original limit established by the basic address field, is believed to have been a significant impediment to expanding the size of a directed token LAN, prior to the present invention.

BRIEF SUMMARY OF THE INVENTION

The present invention allows the number of nodes on a directed-token LAN to be increased beyond the limit of the standard or basic address field while permitting the standard or basic network operating protocol to be retained and used during a reconfiguration sequence of all of the nodes, including the additional nodes, in a token loop. A new reconfiguration sequence and operational protocol is incorporated in the additional or enhanced nodes. The new or enhanced protocol provides additional node addressing capability for the enhanced nodes, and interoperatively interacts with the basic protocol to allow the token loop to be extended from the nodes in the basic range of addresses into the enhanced nodes in an enhanced or expanded range of addresses.

In accordance with its major significant aspects, the directed token LAN of the present invention comprises a plurality of at least three nodes and a network reconfiguration means associated with all of the nodes. Each of the nodes has its own unique address or ID. At least one of the nodes is a basic node having an ID within the basic range of permissible IDs. The basic range is typically established by the size of address field of frames transmitted in accordance with the basic network operating protocol. At least one of the nodes is an enhanced node and is capable of operating in accordance with the basic protocol and in accordance with an enhanced network operating protocol. The enhanced protocol provides one or more enhanced operational capabilities such as an increased data transfer rate or an improved message communication protocol. Each of the enhanced nodes has an ID within either the basic range or within an enhanced range. The enhanced range extends beyond the basic range. At least one of the enhanced nodes has an ID in the extended range. The network reconfiguration means executes a basic reconfiguration sequence and an enhanced reconfiguration sequence. Both reconfiguration sequences pass tokens to locate the next active node of the LAN to establish all of the active nodes in a token loop. Once the token loop is established, the token circulates directly to all of the active nodes in the loop so all of the active nodes, in their turn, can initiate message communications in accordance with either the basic or enhanced protocols.

Execution of the basic reconfiguration sequence of the basic protocol establishes a basic segment of the token loop through the basic nodes in the basic range of IDs. The enhanced reconfiguration sequence begins executing upon the first enhanced node receiving the token. The first enhanced node to receive the token may be an enhanced node with an ID in the basic range, or when there are no enhanced nodes in the basic range, the first enhanced node in the extended range to experience a reconfiguration precedence timeout. Execution of the enhanced reconfiguration sequence of the enhanced protocol establishes the remaining enhanced segment of the token loop through the enhanced nodes and links the enhanced segment with the basic segment to complete the token loop.

Both reconfiguration sequences preferably involve transmitting tokens to an ID which is incremented relative to the ID of the transmitting node, and recording the ID of the next active node which accepts the token at the incremented ID, as determined by sensing network activity created by the next active node after it has accepted the token. Determining the next active node in this manner by executing the reconfiguration sequence completes the token loop, with the next active node ID being the destination ID of the token when it is passed in the token loop.

A reconfiguration precedence timeout procedure preferably initiates network or system reconfiguration. Preferably the nodes with IDs in the basic range initiate the reconfiguration sequences. Should no enhanced node be located in the basic range, an enhanced node in the enhanced range will time out and initiate the reconfiguration sequence, even though some or all of the token loop may have been established through the basic nodes in the basic range. When no enhanced nodes are located in the basic range, one of the enhanced nodes must respond to a token addressed to a predetermined ID in the basic range in order to complete the token loop, even though this same enhanced node will respond to message communications addressed to its own ID in the extended range. Preferably, the predetermined address in the basic range to which the enhanced node responds for token passes, is the address normally reserved for broadcast message communications to the basic nodes.

Preferably, different types of tokens are transmitted during execution of the reconfiguration sequences. A basic token is transmitted by the basic nodes. Enhanced nodes recognize the basic token because the enhanced nodes operate in accordance with the basic protocol. Enhanced nodes transmit extended tokens and enhanced tokens. Enhanced tokens are valid only in the enhanced protocol in accordance with which only the enhanced nodes also operate. Extended tokens appear as valid communications in both the basic and enhanced protocols. Extended tokens are employed to link the completed enhanced segment of the token loop with the basic segment of the token loop and to communicate additional information which is transparent to the basic nodes but which is recognized by other enhanced nodes.

The scope of the present invention is more precisely defined by the appended claims. A more complete understanding of the invention and its embodiments can be gained from the following detailed description and from the accompanying drawings.

BRIEF DESCRIPTION OF THE DRAWINGS

FIG. 1 is an illustration of a bus-type LAN in which the present invention is incorporated, having a network medium connecting multiple nodes, including basic nodes and enhanced nodes.

FIG. 2 is a block-diagram illustration of a portion of FIG. 1, showing the basic and enhanced nodes in greater detail.

FIG. 3 is a generalized block diagram of an interface of a basic or enhanced node of the LAN shown in FIG. 2.

FIG. 4 is a block diagram of an enhanced interface of an enhanced node of the LAN shown in FIG. 2, which is capable of operating at a plurality of different rates and in accordance with a plurality of different protocols when communicating with other nodes of the LAN shown in FIG. 1.

FIG. 5 is a generalized illustration showing the fields of a token which is passed between all of the nodes of the LAN shown in FIGS. 1 and 2.

FIG. 6 is a generalized bit pattern illustration of a basic frame known as a token (ITT), which is communicated between each interface of each basic node of the LAN shown in FIGS. 1 and 2, represented in a basic symbol and basic interval format.

FIG. 7 is a bit pattern and field illustration of the token frame shown in FIG. 6, represented in an enhanced signal and enhanced interval format as decoded by the enhanced interfaces of each enhanced node of the network shown in FIGS. 1 and 2.

FIG. 8 is a bit pattern and field illustration of a token frame shown in FIG. 6, known as an extended token (XITT), represented in enhanced signal and enhanced interval format which is communicated between the enhanced interfaces of enhanced nodes and to the basic interfaces of the basic nodes of the network shown in FIGS. 1 and 2, and which appears to the interfaces of the basic nodes as standard network signaling.

FIG. 9 is a bit pattern and field illustration of a frame shown in FIG. 6, known as a speed or enhanced token (XTOK), which is communicated between the enhanced interfaces of the enhanced nodes of the LAN shown in FIGS. 1 and 2, and which is not decoded by, but which appears to, the interfaces of the basic nodes as standard network signaling.

FIG. 10 is an illustration of one example of a prior art token passing loop established by a basic reconfiguration sequence among only basic nodes of a network.

FIG. 11 is a flow chart illustrating the basic reconfiguration sequence of each interface of each basic node of the LAN shown in FIGS. 1 and 2, to establish a token passing loop among only basic nodes as illustrated in FIG. 10.

FIG. 12 is an illustration of one example of a token passing loop established by the network reconfiguration means according to the present invention among the basic and enhanced nodes of the LAN shown in FIGS. 1 and 2, where both the basic and enhanced nodes have addresses within the basic range of permissible addresses. FIG. 12 illustrates the situation where a basic node times out to initiate the reconfiguration. FIG. 12 also illustrates the types of tokens illustrated in FIGS. 7 to 9 which are passed to establish the loop, and which are passed in the normal course of network operation after the token loop is established.

FIG. 13 is an illustration of another example of a token passing loop establishing by the network reconfiguration means according to the present invention among the basic and enhanced nodes of the LAN shown in FIGS. 1 and 2, where the addresses of some of the enhanced nodes and all of the basic nodes are within the basic range of permissible addresses and the remaining enhanced nodes have addresses in an enhanced range of permissible addresses beyond the basic range of addresses. FIG. 13 illustrates the situation where a basic node times out to initiate the reconfiguration. FIG. 13 further illustrates the types of tokens shown in FIGS. 7 to 9 which are passed to establish the loop, and which are passed in the normal course of network operation after the loop is established.

Figure 14:
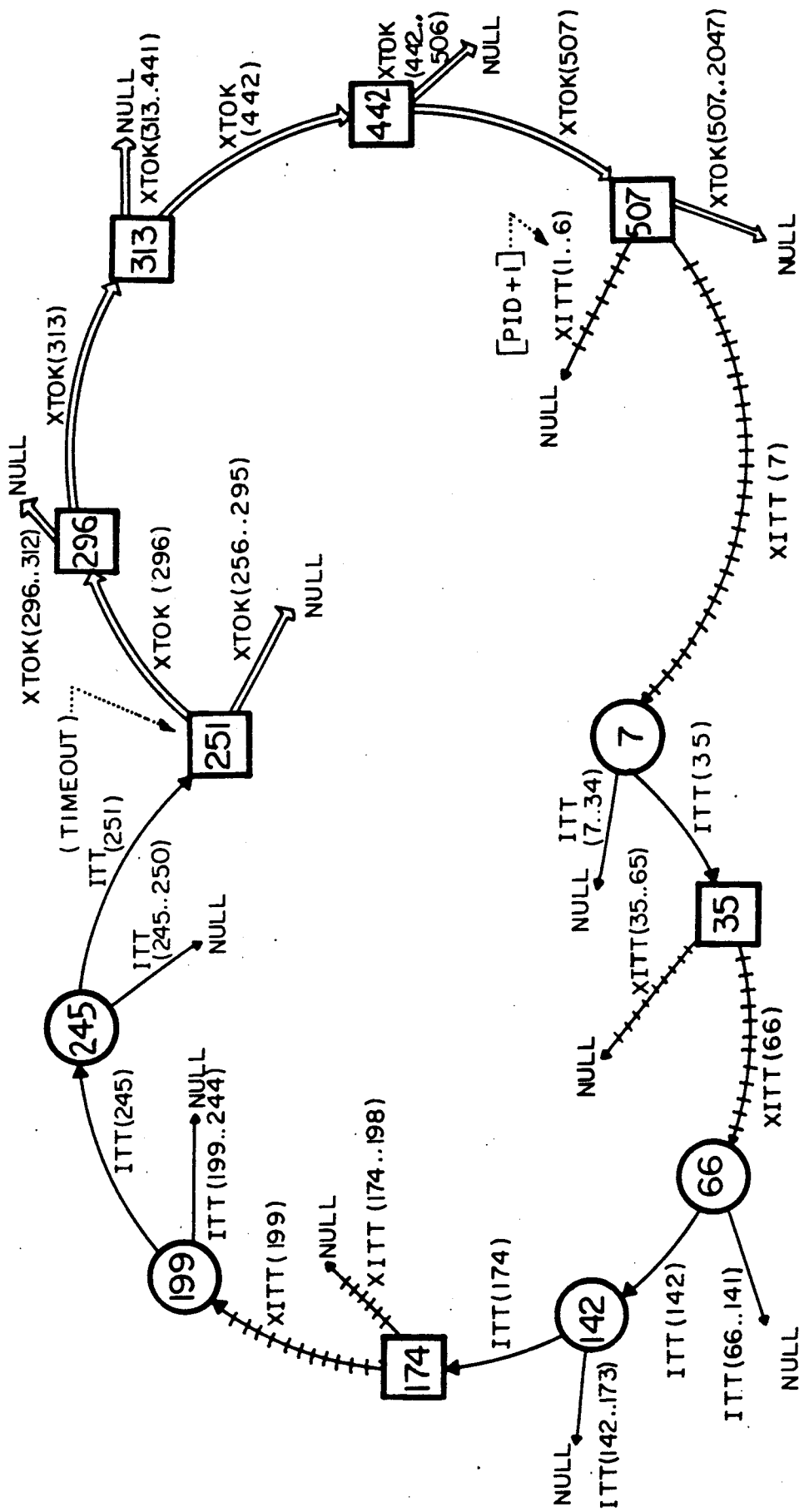

FIG. 14 is an illustration of another example of a token passing loop established by the network reconfiguration means according to the present invention among the basic and enhanced nodes of the LAN shown in FIGS. 1 and 2, where the addresses of some of the enhanced nodes and all of the basic nodes are within the basic range of permissible addresses and the remaining enhanced nodes have addresses in an enhanced range of permissible addresses beyond the basic range of addresses. FIG. 14 illustrates the situation where an enhanced node times with an address in the basic range out to initiate the reconfiguration sequence. FIG. 14 further illustrates the types of tokens shown in FIGS. 7 to 9 which are passed to establish the loop, and which are passed in the normal course of network operation after the loop is established.

FIG. 15 is an illustration of another example of a token passing loop established by the network reconfiguration means according to the present invention among the basic and enhanced nodes of the LAN shown in FIGS. 1 and 2, where only basic nodes have addresses within the basic range of permissible addresses and all of the enhanced nodes have addresses in the enhanced range of permissible addresses. FIG. 15 illustrates time-outs which occur first at one basic node and later at one enhanced node during which and by which the token passing loop is established during reconfiguration. FIG. 15 also illustrates the types of tokens shown in FIGS. 7 to 9 which are passed to establish the loop, and which are passed in the normal course of network operation once the loop is established.

FIG. 16 is an illustration of one example of a token passing loop established by the dynamic reconfiguration sequence according to the present invention among only enhanced nodes of a LAN where all of the enhanced nodes have addresses in the enhanced range of permissible addresses. FIG. 16 also illustrates the types of tokens shown in FIGS. 8 and 9 which are passed to establish the loop, and which are passed in the normal course of network operation once the loop is established.

Figure 17A:
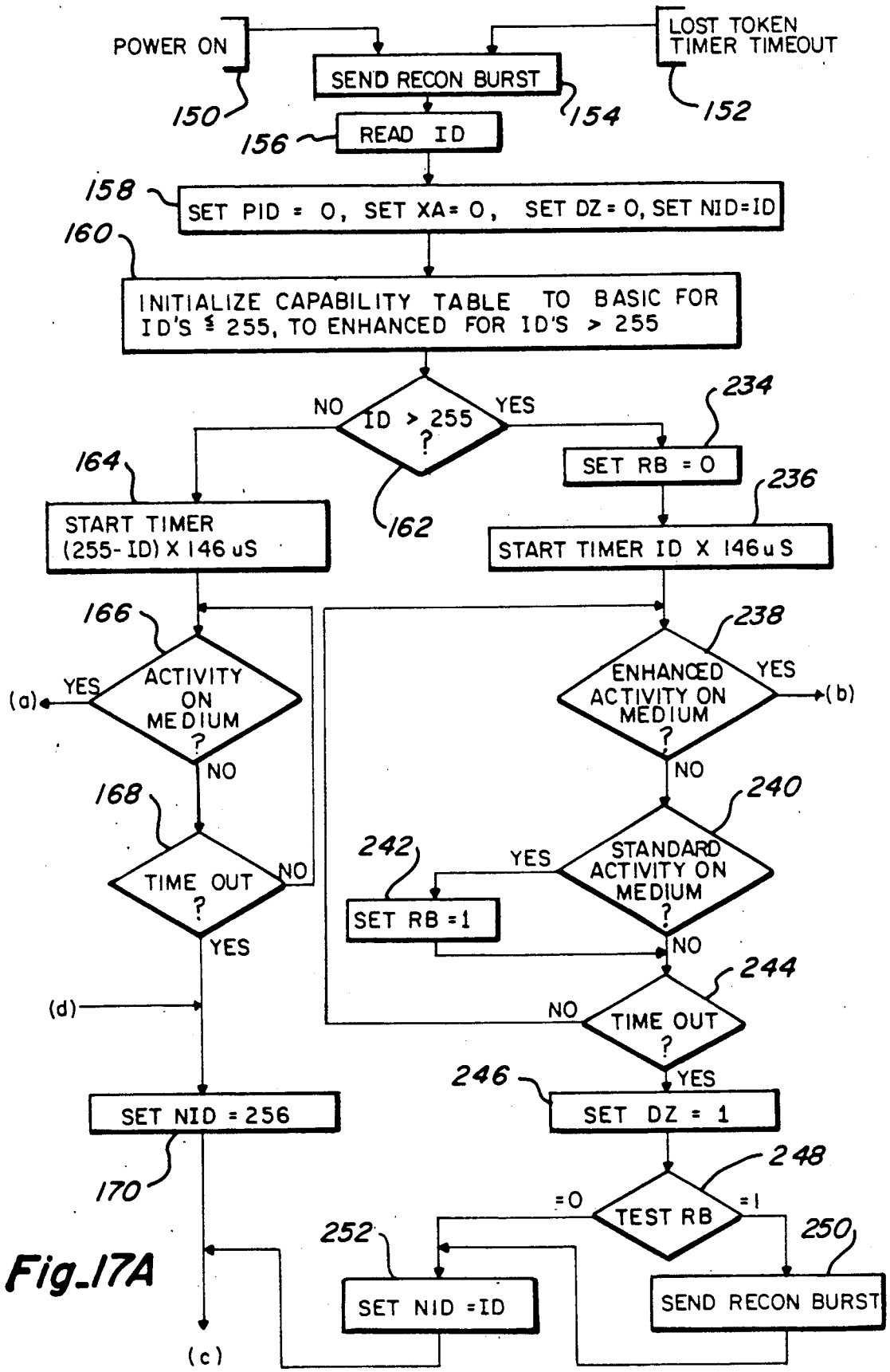

FIGS. 17A, 17B and 17C are complementary illustrations which form a flow chart illustrating the reconfiguration sequence performed by the enhanced interfaces of the enhanced nodes of the LAN shown in FIGS. 1 and 2.

DETAILED DESCRIPTION

The present invention applies to a local area network (LAN or "network") such as that shown in FIGS. 1 and 2. The LAN comprises a plurality of nodes 40 which are all commonly interconnected to a communication medium 42. The communication medium 42 includes means by which signals are transmitted between the nodes 40. The communication medium may take the form of a plurality of interconnected signal communication links, such as coaxial cables, twisted cable pairs, optical links, radio links, or combinations of these and others.

The LAN illustrated in FIGS. 1 and 2 is a bus-type LAN, meaning that all of the nodes 40 are connected to a single logical point (the medium 42) and logically in parallel with one another. An essential characteristic of a bus-type LAN is that each transmission by any node is directly received by all of the other nodes. Typically, the nodes are connected through connecting point devices known as hubs 44. A hub 44 is a means by which a plurality of signal communication links can be connected together, thus connecting all the communication links to a single common logical point, the medium 42. Hubs facilitate cable management, signal amplification and/or fault isolation. Hubs neither interpret nor modify LAN communications. Each node of a bus-type LAN may directly address and communicate with other nodes through the single logical point.

Each node 40 of the LAN has its own unique network address, known as an identification (ID). This address or ID is assigned to the node at the time the node is physically connected to the LAN medium 42. The numbers enclosed within the circles and the boxes in the nodes 40 shown in FIGS. 1 and 2 are representative examples of network addresses.

The nodes 40 communicate with each other by transmitting "frames" of data. Each frame typically include the address of the node to which the frame is destined, referred to as a DID. The node which initiates the communication, hereinafter referred to as a "source" node, includes the DID of the node to which the transmission is destined as a part of the frame transmitted over the medium 42. The node to which the communication is destined is referred to as a "destination" node. Since all of the other nodes on the LAN also receive the signals transmitted by the source node, the DID is utilized by each node on the network to recognize and accept only those transmissions addressed to it, while discarding or not recognizing the other transmissions not addressed to it. In addition, since some communications over the network involve multiple transmissions of signals between the source and destination nodes, the source node also frequently includes its own address (SID) in transmissions so the destination node can utilize that address when replying. Broadcasts, which are received by all nodes, and multicasts which are received by predefined groups of nodes, are also made possible by this addressing technique.

One well known, token-passing, bus-type LAN which has a basic address field limitation of eight bits is that manufactured and sold by the assignee hereof under its United States registered trademark ARCNET. An extensive amount of information has been published on the ARCNET LAN, both by the assignee of the present invention and by others. Components to implement the ARCNET LAN are commercially available from sources including the assignee and others. One source of information concerning the ARCNET LAN is the *ARCNET Designer's Handbook* published by Datapoint Corporation, San Antonio, Tex., copyright 1983. The basic aspects of the preferred embodiment described herein are those of the ARCNET LAN, although the present invention has applicability to directed-token LANs other than the ARCNET LAN.

Two different types of nodes 40 are present on the LAN in accordance with the present invention. As is shown in FIGS. 1 and 2, basic nodes at IDs 81, 153 and 247 and enhanced nodes at IDs 21, 29 and 39, are both connected in the LAN. The basic nodes have only a single basic or common operational capability, and therefore always operate in accordance with this common operational capability. The enhanced nodes have multiple different operational capabilities. One of the multiple operational capabilities available from each enhanced node is the common operational capability also present in each basic node. Thus, both the enhanced and the basic nodes have one common operational capability which may be used for communication.

Operational capability as used herein may refer to a variety of substantially different operational functionalities. Examples of multiple different operational capabilities contemplated by the present invention are different message communication protocols and different data transfer rates between the nodes. As an example, but not to be used to construe the extent of the difference in operational capabilities, the common data transfer rate may be at 2.5 million bits per second, while the enhanced data rate transfer capability may be 20 million bits per second.

In accordance with the present invention, the enhanced nodes of the LAN are capable of dynamically selecting among themselves which of the operational capabilities to employ in communicating with another enhanced node and with a basic node. The common operational capabilities of each basic node remain unaffected by the presence of the enhanced nodes, thus preserving the normal operational capability of the LAN and avoiding the necessity to replace the whole LAN to obtain enhanced communication capabilities between a limited number of high performance nodes, i.e. the enhanced nodes. More details regarding the enhanced nodes and their enhanced capabilities are described in the two previously mentioned applications LAN WITH DYNAMICALLY SELECTABLE MULTIPLE OPERATIONAL CAPABILITIES and LAN WITH INTEROPERATIVE MULTIPLE OPERATIONAL CAPABILITIES.

The common and enhanced operational capabilities of the basic and enhanced nodes of the LAN are illustrated by the dash lines 46 and 48 shown in FIG. 2. The longer dash lines 46 represent the common operational capability. The enhanced node ID 21 may communicate at the common operational capability with the basic node ID 81. Similarly, the basic node ID 81 can communicate only at the common operational capability with another basic node ID 153 and with an enhanced node ID 39. The shorter dash lines 48 illustrate an enhanced operational capability which is used only by the enhanced nodes. The enhanced node ID 21 may communicate only with the other enhanced nodes, e.g. ID 39, at the enhanced capability. As is represented by the longer dash lines 46 and the shorter dash lines 48, the enhanced nodes can communicate at both operational capabilities, while the basic nodes can communicate only with the common operational capability. Of course, the network medium 42 carries the signals representative of either type of operational capability with equal facility.

Each node includes an interface 50 or 52 by which signals are applied to and received from the medium 42, as is shown in FIG. 2. Enhanced nodes include enhanced interfaces 50, while the basic nodes include basic interfaces 52. Each node, whether enhanced or basic, also includes a host computer or processor (not shown) which performs various data processing functions, or a controller performing various data transfer functions. For example, a node may include a personal computer, work station, a network server computer, or network connected I/O device, interface, sensor or actuator, or the like, which transmits and receives data over the medium 42.

The function of the interfaces 50 and 52 is to send the data over the medium, to receive the data from the medium, to receive the data to be sent on the medium from the host processor, and apply the data received from the medium to the host processor, so that the host processor can function in an efficient and reliable manner. Because each node includes an interface 50 or 52, the functionality of the interfaces is distributed throughout all of the nodes of the LAN.

The basic components of a typical interface 50 or 52 are illustrated in FIG. 3. A transceiver 54 applies the electrical, optical or other physical signals to the medium 42 and receives the signals from the medium 42. A physical level protocol interface 56 receives electrical signals from the transceiver 54 and applies electrical signals to the transceiver 54. The signals transmitted on the medium 42 are in serial form. One of the functions of the physical level protocol interface 56 is to convert the serial data stream into a parallel data stream for use by the other elements of the node, and to convert the parallel data stream from the other elements of the node into a serial data stream. The term "physical level" used in reference to the interface 56 is the well known physical layer in the seven layer reference model for network communications. The physical level or layer is responsible for interfacing with the medium 42, detecting and generating signals on the medium, and converting and processing the signals received from the medium. In very general terms, the physical layer concerns the general encoding of network data into waveforms which will travel on the medium, and decoding those waveforms when received. The physical level protocol interface 56 and the transceiver 54 achieve these functions.

Each interface 50 or 52 also includes a link level protocol engine 58. "Link level" again refers to the standard seven layer reference model for networks, and generally relates to sending and receiving frames of data over the medium 42 and controlling access to the medium 42. Frames of data, as will be discussed below, relate to groupings of various physical level signals in such a way to achieve the desired network functionality. For example, all the functions involved in sending and receiving frames, including inserting starting delimiters, ending delimiters, and stripping these off once the data is received, are link level functions. Other link level functions are access control to the medium and the handling of affirmative and negative acknowledgements. The link level protocol engine 58 controls and executes the reconfiguration sequence functionality to which this invention relates. The higher levels of communication in the seven layer model are generally handled by the host or I/O processor of the node. Even though it is preferred to implement the functionality of the interfaces in a distributed manner in each node, some of this functionality, for example media access control, can be implemented on a centralized basis, as is known.

More reliable network interfaces generally provide a separate link level protocol engine 58, generally implemented as a micro sequencer operating from firmware. However, many of the link level functions could also be achieved by the host processor. Generally speaking, the advantages of providing a separate link level protocol engine 58 are that its functionality is generally independent from the host processor, and therefore it offers more reliability and interoperability in LAN functionality. The functionality of the link level protocol engine 58 in the common capability of operation is identical in all nodes, and its functionality is isolated and secure against possible malfunctions in the host software or hardware. A second reason for providing a separate link level protocol engine 58 is that the time dependent aspects of the operation of the host processor are isolated from the time dependent aspects of data communication over the LAN. Use of the separate link level protocol engine 58 avoids sporadic timing problems between the host processor and the signals on the LAN. Lastly, the use of the separate link level protocol engine 58 allows some of the functionality from the host processor to be off-loaded, thereby increasing the productivity of the host processor.

Basic interfaces 52 for the ARCNET LAN are commercially available from a wide variety of sources, and are known as resource interface modules (RIMs). The link level protocol engine 58 which is used on the ARCNET LAN is commercially available as an integrated circuit designated COM90C26 from Standard Microsystems Corp. and 90C26 from NCR Corporation. The physical level interface 56 used on the ARCNET LAN is commercially available as an integrated circuit designated COM90C32 from Standard Microsystems Corporation and 90C32 from NCR Corporation.

An example of an enhanced interface 50 is shown in FIG. 4. The common and enhanced operational capabilities selected for illustration of the present invention are different data communication rates. Accordingly, the enhanced interface 50 includes a common rate transmitter 60 and an enhanced rate transmitter 62, each of which operates at a different data rate. The transmitters are commonly connected to the network medium 42. A common rate receiver 64 and an enhanced rate receiver 66 are also included in the interface 50. These receivers commonly receive signals from the network medium 42. The common rate transmitter 60, and the common rate receiver 64 operate at the common data rate. Therefore, the enhanced interface 50 will always be able to transmit and receive at the common data rate. The enhanced transmitter 62 and the enhanced receiver 66 have a substantially different data rate communication capability, compared to the common rate. The data rate capabilities of the enhanced transmitter 62 and the enhanced receiver 66 are preferably the same in all of the enhanced nodes.

The various transmitters and receivers illustrated in the enhanced node 50 may actually be separate items, as indicated in FIG. 4, or may be integrated into a single device 68. One example of a transceiver capable of communicating at common and enhanced data rates is disclosed in the application for MULTIBIT AMPLITUDE AND PHASE MODULATION TRANSCEIVER FOR LAN, referenced above.

Each enhanced node 50 also includes a network protocol controller 70. In a typical case, the network protocol controller 70 will control all of the physical and link level protocol functionality, leaving the network, transport and other higher levels of network functionality to the host processor of the node. The network protocol controller 70 is the preferred means for achieving the reconfiguration sequence functionality described herein.

The protocol controller 70 controls a transmitter selector 72 which in turn supplies a control signal 69 to the transmitters 60 and 62 to activate the selected transmitter. Data from the host computer is converted by the protocol controller 70 into the appropriate frame format for both the common and enhanced operational capabilities. The protocol controller 70 assures that all transmissions are in accordance with the established protocols for the selected operational capability. Media access is controlled by the protocol controller 70.

The enhanced interface 50 also includes a receiver selector-discriminator 74. Signals from the network medium 42 are preferably applied as control signals at 76 to the selector-discriminator 74. In the majority of cases, the signals supplied over the medium 42 will unambiguously identify the rate and protocol at which those signals are transmitted. The physical characteristics or signal elements of the signals may distinguish the data rates from one another. The signals form a control signal at 76 which allows the selector-discriminator 74 to select one of the data paths 78 and 80 from the receivers 64 and 66, respectively, which will be coupled through the selector-discriminator 74 over the data path 82 to the network protocol controller 70. Of course, the network protocol controller 70 removes the various links and physical level control information from the signals in the data path 82, and supplies those remaining signals to the host processor of the node. The selector-discriminator 74 discriminates among the various data rates present on the medium 42, and selects the appropriate receiver which supplies the data to the network protocol controller 74.

A capability table 84 is also connected to the protocol controller 70, in the enhanced interface 50. The capability table is a random access memory (RAM) in which information is recorded regarding the capabilities and status of other nodes on the network. This information is made available to the protocol controller 70 for use in selecting the transmitters and receivers for communication. The capability information is recorded in the table 84 in association with the ID of each node.

In addition to controlling the selection of the transmitter, the data in the capability table 84 may also be used by the protocol controller 70 to supply a control signal at 86 to the receiver selector-discriminator 74 for selecting the appropriate one of the receivers to receive transmissions. The control signal at 86 is used by the selector-discriminator 74 when the characteristics of the raw signals applied at 76 are insufficient to discriminate between multiple different data rates on the medium 42. Under such circumstances, the protocol controller 70 would obtain information, either from the host processor, the capability table 84 or from other sources, that transmissions from a particular other node would be arriving at a particular rate. Under those circumstances, the signal at 86 would select the appropriate receiver to apply output signals over the data path 82 to the protocol controller 70.

The capability table 84 may not be needed in practicing this invention, as is described more completely in the applications LAN WITH DYNAMICALLY SELECTABLE MULTIPLE OPERATIONAL CAPABILITIES and LAN WITH INTEROPERATIVE MULTIPLE OPERATIONAL CAPABILITIES.

Based on the information recorded in the capability table 84 or otherwise obtained, the source node will generally transmit at the highest data rate that the destination node is capable of receiving during normal communications. However, it should also be recognized that a destination node and source node could dynamically negotiate or establish a data rate on a communication by communication basis which is less than their maximum capabilities if such circumstances are appropriate. Examples of such circumstances might be where optical or radio communication links are included in the medium 42 and atmospheric or other environmental influences have degraded the integrity of the communication link to a point where the high data rate is more likely to result in an unacceptable amount of transmission errors.

The network protocol controller 70 is preferably implemented by a micro-sequencer operating from firmware. Alternatively, the majority of the functions of the network protocol controller 70 could also be implemented on the software of the host computer of the node, but for the reasons previously mentioned, including reliability, compatibility and economical implementation, a separate network protocol controller 70 is preferred. Details of the reconfiguration sequence functionality preferably provided by means of the network protocol controller 70 to dynamically and automatically establish a directed token passing loop among basic and enhanced nodes, including enhanced nodes at addresses greater than those permitted in the basic range of permissible addresses, is set forth below.

In token passing LANs, the functionality for passing the token is typically distributed to each of the node interfaces 50 and 52 (FIG. 1). A token is a predetermined frame which, when received by the interface of a particular node identified by its network address, enables that particular node to initiate a message communication. Each interface includes its own components for identifying the network address of the next active node of the network and for passing the token to the next active node. Centralized token passing control techniques for LANs are also known. In centralized token passing control, a centralized node or processor controls the passage of the token from one active node to the other. The present invention has applicability to both distributed and centralized control arrangements for directed token passing in a LAN.

In addition to its own ID, the address of the next active node (NID) in the rotational sequence of token passing is established and maintained in each node interface 50 and 52. An active node is one which is currently able to participate in network communication but which may or may not have messages to communicate. Inactive nodes, that is those nodes which are not functioning at that time and are therefore not able to participate in network communication, are eliminated from the token passing loop. Only the active nodes participate in token passing.

Upon receipt of the token, the node initiates a message if it has a message to communicate. At the conclusion of the message, or if no message is to be communicated, the token is passed to the next active node in the rotational sequence. In this manner, the token is passed from active node to active node in an even rotational sequence or token passing loop.

The even rotational sequence of basic token passing is typically from a basic node of a lesser network ID to the next active basic node at the next higher network ID in the basic range of permissible addresses. A basic token passing loop is illustrated in FIG. 10. However, when a token loop is established through both the basic and enhanced nodes in accordance with the present invention, the token loop includes a basic segment through the basic nodes and an enhanced segment through the active enhanced nodes in the enhanced range of addresses. Once the token commences circulating through the active enhanced nodes in the enhanced range of addresses, the token passes from the active enhanced node of the lowest ID through all of the active enhanced nodes in an increasing ID sequence, and from the active enhanced node at the highest enhanced range ID back to the next active node in the basic range of permissible addresses. When the token reaches the active basic node of the highest ID, the token is passed to the active node of the lowest ID to commence the next token loop. Token passing loops involving both basic and enhanced nodes are shown in FIGS. 12-15, and a token passing loop involving only enhanced nodes is shown in FIG. 16.

Each node stores the address (NID) of the next active node in the token loop. In this manner, each active node knows the next active node in the loop to which the token is to be addressed when the token is passed. To establish the NID of the next active node for token passing purposes in all of the active nodes, network or system reconfiguration occurs. The present invention relates to automatically establishing or reconfiguring a token loop to include basic and enhanced nodes in the basic range of permissible addresses and enhanced nodes in an enhanced range of permissible addresses beyond the basic range of addresses. In the ARCNET LAN, the basic range of addresses is from 0 (indicating a broadcast, except in one situation described below) to 255. According to the present invention, the enhanced range is from 256 up to the maximum point which may be almost unlimited but which is selected for illustration of this invention to be 2047.

Network reconfiguration starts upon power on of the network, whenever a new node becomes active on the network, or whenever any node has not received the token in a predetermined period of time. At the beginning of the basic network reconfiguration sequence, the interface initializes its NID to its own ID. A reconfiguration precedence timeout procedure at each interface is used to select the basic node with the highest assigned ID, and that node commences sending a token. The first token is sent to an ID which is equal to its own assigned ID. Sending the first token to the node's own ID is convenient for implementation at the link level in the network protocol controller, but does not result in passing the token. The first functional token passing attempt, however, is to the NID which is the assigned ID of the node plus one. After sending that token, the interface waits for activity on the medium. Such activity occurs only where another node has received the token and is sending a message or passing the token itself. If no activity is sensed within a predetermined time, the interface increments its NID and repeats the process. The process continues until the next active node is addressed and that node responds to the token by creating network activity. At that point, the interface which sent the token successfully to the next active node senses the activity and establishes the correct NID for that next active node in the token loop. The next active node repeats the procedure until it too has established its NID and successfully passed the token. Incrementing the NID in the basic range of addresses is performed modulo the size of the LAN address field (256 in the case of conventional ARCNET), to produce a wrap-around from the highest ID in the basic range to a zero ID in the basic range ((255+1) modulo 256, is 0). All of the interfaces of all of the basic nodes of the LAN function in a similar manner. A somewhat different situation occurs in enhanced nodes, as is described below, but incrementing the NID of the enhanced nodes is still employed until the NID of each enhanced node is determined, which establishes the complete token passing loop through all of the active nodes.

Network or system reconfiguration can occur at any time to allow new active nodes to enter the token loop. When an interface is first powered on or when it has not received a token for a predetermined time period (as established by a lost token timer), it sends a reconfiguration burst. A reconfiguration burst is a unique signal pattern which is longer than any type of frame so it interferes with any communication which is attempted or in progress. This interference prevents passing the token, thereby forcing system reconfiguration.

Another type of reconfiguration which can occur allows previously active but now inactive nodes to drop out of the token loop. This reconfiguration does not involve network-wide reconfiguration. When an active node becomes inactive and drops out of the rotational sequence, the attempted token pass to the newly inactive node will result in no interface receiving the token. The node which unsuccessfully attempted to pass the token to the previously active but now inactive node will sense a lack of activity that would have otherwise resulted if the node had accepted the token. After a predetermined time period which is shorter than the lost token time period before system reconfiguration occurs, the node which unsuccessfully attempted to pass the token will commence the reconfiguration sequence of incrementing its NID and sending tokens until a token is successfully passed, as in a system reconfiguration previously explained. However, once the token is successfully passed the token loop is re-established because all of the other nodes in the loop remain active and retain the NIDs they previously established during system reconfiguration. Thus, when a previously active but now inactive node drops out of the loop, only the preceding active node in the token loop will establish a new NID, thereby saving some of the time required to create a network-wide reconfiguration.

Communication between nodes occurs by sending and receiving frames. Since each frame is in reality a serial stream of signals on the LAN medium, each frame is separated by an interframe gap (IFG) of silence or absence of signals on the medium. The duration of the interframe gap is usually established based on fundamental physics and relates to the propagation delays created in part by the physical size of the network. The purpose of the interframe gap is to allow the medium to quiesce after signals have been applied to it, and to allow the transceiver circuitry to be made ready for the next frame. For most LANs, the interframe gap is at least equal to the physical settling time of the medium.

A token frame 100 is illustrated in FIG. 5. The token is broken into a number of fields: a starting delimiter (SD) 102, a type field 104 (which for a token is designated EOT for "end of tranmission"), two identical repeated fields 106 which each contain the destination address of the token (which is the NID of the next active node in the token loop), and an ending delimiter (ED) 108. The SD 92 is typically a fixed pattern of signals used to indicate that the frame is beginning and to provide the necessary synchronization or calibration information for the receiver at the destination node. The ED 108 is a pattern of signals (silence in the case of ARCNET) which is fixed in length and in content and serves to mark the end of the frame 90. The SD and ED are physical level protocol elements and are described in greater detail below. The NID of the token is repeated to prevent tranmission errors from causing the wrong node to receive the token. If the two NID fields do not match the token is ignored. A field for the ID of the source node (SID) may or may not be present in a token depending both on the type of network and the type of token. For example, in most token based networks including the ARCNET LAN, an SID is not present in the token frame.

In order to successfully interoperatively incorporate two or more different operational protocols in a single LAN, the different communication protocols cannot interact with one another so as to cause errors or to generate spurious, invalid data, but yet the two protocols must create an appearance of valid activity in at least one (the common) and possibly both protocols. The protocols must not violate or conflict with one another. The protocols must be clearly separable, so the enhanced protocol and the enhanced aspects of an interface function reliably at the enhanced capability, and the basic or common protocol and basic aspects of the interface function reliably at the basic capability.

To successfully adapt a second different communication protocol and capability to a basic LAN as described herein, considerations must be given to compatibility and interoperability of the physical signals applied to the medium, the transparency of certain signals to the basic interfaces, the frames transmitted in each protocol, the basic and enhanced protocols, and other factors. These compatibility considerations are described in greater detail in the applications LAN WITH DYNAMICALLY SELECTABLE MULTIPLE OPERATIONAL CAPABILITIES, LAN WITH INTEROPERATIVE MULTIPLE OPERATIONAL CAPABILITIES, and MULTIBIT AMPLITUDE AND PHASE MODULATION TRANSCEIVER FOR LAN.

The standard electrical signal applied by the basic interfaces to the LAN medium to signify a one bit is a basic dipulse, in conventional ARCNET. The dipulse is applied for a time period or interval which in a standard ARCNET LAN is 200 nsec, followed by an equal length period or interval of 200 nsec of silence or absence of a physical signal following each dipulse. To transmit a one bit digital indication in the basic network protocol, the dipulse is applied during an interval and is followed by the silence interval. To transmit a zero bit digital indication, two periods of silence exist sequentially. Thus in the basic and common protocol, the dipulse or a silence signal is applied in one interval followed sequentially by another interval of silence or absence of a signal. This pattern of interval pairs in which the second interval is always silence and the first interval is always a basic dipulse or silence is the basic or common signaling technique.

The basic token 100 is illustrated in FIG. 6 in terms of the actual coding for the fields 102, 104 and 106. Each basic dipulse is represented by a "1" signifying a single bit, followed by an interval of silence in which no marking is illustrated. A 0 symbol also represents a signal indicating the absence of a dipulse, indicative of a 0 bit. Each 0 bit is also followed by an interval of silence which is also not marked.

In order to communicate in a second enhanced protocol and to achieve an enhanced data rate capability, the second interval in each pair of intervals is utilized to present signals. Further, the signals applied during both signal intervals are amplitude and phase modulated to thereby achieve even greater data transfer capabilities, as is discussed in the applications LAN WITH INTEROPERATIVE MULTIPLE OPERATIONAL CAPABILITIES and MULTIBIT AMPLITUDE AND PHASE MODULATION TRANSCEIVER FOR LAN.

The token frames in the basic protocol and the enhanced protocol are shown in FIGS. 6 to 9. Only the token frames are shown because the other frame types of the basic protocol and the enhanced protocol are not affected by, and are not directly used in, the present invention. Three types of token frames are utilized in the present invention: an ITT shown in FIGS. 6 and 7; an XITT shown in FIG. 8; and a XTOK shown in FIG. 9.

The ITT (Invitation To Transmit) standard or basic token frame 100 shown in FIGS. 6 and 7 is passed by basic nodes. The specific coding for the ITT is illustrated. FIG. 6 illustrates the manner in which a basic interface interprets the ITT, where the second silent interval of each pair of intervals of the ITT is not recognized by the basic interface. FIG. 7 illustrates the manner in which each enhanced interface interprets the ITT, where the second silent interval of each pair of intervals of the ITT is interpreted as a zero signal element. The interpretations by both the basic and enhanced nodes are without conflict.

The XITT (eXtended Invitation To Transmit) extended token frame 110 shown in FIG. 8 is passed between enhanced nodes and is interpretable by both basic nodes and enhanced nodes. When received by a basic node, an XITT appears indistinguishable from an ITT, as illustrated in FIG. 7, because the signals in the second interval of each pair of intervals are not interpreted by the basic node. In an XITT, the fourth interval of the starting delimiter is a 1 rather than a 0, permitting the XITT to be distinguished by enhanced nodes from the ITT (FIG. 7). However, additional information (called the "flag" and represented by "f"s) is encoded in the SD of the XITT in the 6th, 8th, 10th and 12th intervals. This additional information does not conflict with interpretation of an XITT by standard nodes, but is decoded by enhanced nodes. The last four bit-pairs ("1f") in the SD each include a bit, the "f", by which information on the capabilities of the enhanced node transmitting the XITT frame is communicated. These "f" bits are used to encode information relating to the transmission speed and capabilities of the enhanced node transmitting the XITT, as well as transmitter and receiver status of that node. This coding is further explained in the co-pending applications for LAN WITH DYNAMICALLY SELECTABLE MULTIPLE OPERATIONAL CAPABILITIES and LAN WITH INTEROPERATIVE MULTIPLE OPERATIONAL CAPABILITIES.

The XTOK (eXtended TOKen) enhanced or speed token frame 112 is shown in FIG. 9. Enhanced nodes pass the XTOK to other enhanced nodes. The XTOK cannot be interpreted by basic nodes, but it does appear as network activity to basic nodes. The DID fields contain the address of the node to which the XTOK is directed. Each DID field contains 12 bits rather than the 8 bits contained in the DID fields of the ITT and XITT frames. The XTOK provides the means by which enhanced nodes pass the token and, subsequently, communicate data packet frames, to enhanced nodes within the enhanced range of addresses which are greater in number than the standard range of addresses (0-255). By using 11 bits of the DID address field in the XTOK 112, up to 2047 nodes may be individually defined and addressed.

FIG. 10 illustrates a token passing loop for nodes having addresses within the basic range of permissible addresses. If some of the nodes are enhanced nodes, one enhanced node may send an XTOK to a next subsequent enhanced node, but unless two enhanced nodes are in sequential order, the token passing occurs by the basic nodes sending ITTs and the enhanced nodes sending XITTs, as represented by the longer dashed lines 46.

FIG. 11 shows the flow of a basic reconfiguration sequence implemented as a part of the basic network operating protocol by the link level protocol engine 58 (FIG. 3) of each basic node. The information contained in the first two applications mentioned above is slightly different than that shown in FIG. 11, became aspects of the receive and transmit sequence which are not related to the reconfiguration sequence of this invention have been eliminated from FIG. 11. A convention used below is that the steps or functionality in each flow chart is represented by reference numerals and each reference numeral is enclosed within parenthesis in the following text.

The reconfiguration sequence is entered from power-on reset (120) or timeout (122) of a lost-token timer (which is generally called the RECON timer in ARCNET terminology). When either of these events (120 or 122) occur, a reconfiguration burst is sent (124) to halt other activity on the network and thereby force reconfiguration of the token loop.

Each interface then proceeds to read (126) its own assigned network address (ID) and set (128) its next ID (NID) register equal to its own assigned ID. The timeout-based selection of the node which will begin by each node initializing (130) a timer (sometimes referred to as the "reconfiguration precedence timer") to a value of $(255 - ID) \times 146$ usec. The node which will time out first is the active node with the highest assigned ID in the basic range of addresses. During the timeout period established (130), each node monitors (132), the network for activity and, if activity is detected, terminates (136) its reconfiguration processing and goes to its normal receive sequence to decode the detected activity. The normal receive sequence is described more fully in the applications for LAN WITH DYNAMICALLY SELECTABLE MULTIPLE OPERATIONAL CAPABILITIES and LAN WITH INTEROPERATIVE MULTIPLE OPERATIONAL CAPABILITIES.

If the timer expires (134) before any network activity is detected, no other node has started. Therefore, the node which experienced the timeout has the highest ID of any active basic node and must commence the reconfiguration sequence. This node proceeds to send (138) an ITT frame (attempted token pass) to the current value in its NID register, then wait (140) up to 78.4 microseconds for subsequent activity (which would be a token pass by a node receiving this token). The time period of 78.4 microseconds is specific to the ARCNET LAN, but in more general applicability is a time period which is greater than that time period during which the destination node would normally commence transmissions and is less than the time period established (122) by the lost token timer. If such activity is detected, the node enters (136) the normal receive sequence to monitor the activity. A discussion of the normal receive sequence is not included here, but is included in the first two mentioned applications.

If no such activity is detected, the basic node increments (142) the NID by 1, modulo 256, and returns to send (138) an ITT to this incremented NID value. This looping (138, 140, 142) will continue until the next active NID value is found, as evidenced by the node detecting (140) activity when the next active node in the token loop starts transmitting the token.

The transmit sequence ends (144) by entering this loop (138, 140, 142) as the normal means of passing the token. In the usual case, a token will be passed to the NID, after which activity, either in the form of a token pass or the transmission of some other frame will be observed within the 78.4 microsecond period. In the case where the NID node has become inactive since the last time it received the token, the final loop (138, 140, 142) of the reconfiguration sequence is executed until the next active node is addressed and the new NID of this node is established. This describes the partial reconfiguration mentioned above.

The present invention provides a reconfiguration means to establish a token loop to include basic and enhanced nodes in the basic range of permissible addresses, and to allow additional enhanced nodes at an enhanced range of addresses beyond the basic range of addresses to be included on the network, and to automatically and dynamically include the additional enhanced nodes at addresses in the enhanced range in a token loop which encompasses basic and enhanced nodes. The token loop is established by executing a reconfiguration sequence of a reconfiguration means which and interoperatively combines with the basic reconfiguration sequence available from the basic operating protocol of the basic nodes. The nature of the token loops established and the tokens passed during this reconfiguration sequence are illustrated in FIGS. 12 to 16. The flow of the reconfiguration sequence of the present invention is illustrated in FIGS. 17A, 17B and 17C.

In FIGS. 12 to 16, circles are used to show basic nodes and rectangles are used to show enhanced nodes. The numbers within these rectangles or circles are the addresses of the nodes. The arrows between the nodes, or pointing to null, are token passes or unsuccessful token pass attempts, respectively, during the reconfiguration sequence. Plain arrows represent ITTs, arrows with cross-hatching represent XITTs, and double lined arrows represent XTOKs.

FIG. 12 shows a case where all nodes, both basic and enhanced, have addresses or IDs within the basic range of permissible addresses, i.e. less than 256. A 7-node network is illustrated with 5 basic nodes and 2 enhanced nodes. The reconfiguration precedence timeout occurs at basic node 245 and node 245 proceeds to send ITTs and get no response from nodes at IDs 245 to 255, and then, following the modulo-256 incrementation of NID, sends ITTs to and gets no response from the nodes at IDs 0 through 6. Thereafter the token is successfully passed to node 7. Node 7 commences sending ITTs to addresses 7 through 34 with no response, before successfully passing the token to node 35.

Node 35, being the first enhanced node to receive the token, will not have detected the transmission of any enhanced protocol token frames (XITTs or XTOKs) since the beginning of the network reconfiguration sequence, because only ITTs have been sent so far during this reconfiguration sequence. Node 35 will then set its NID to 256, the first address in the enhanced range, and commence sending XTOKs to IDs 256 through 2047. XTOKs will be sent because no basic nodes may have addresses greater than 255. Because no enhanced nodes in the enhanced range of addresses are present on the network there will be no response to these XTOKs. Node 35 will then commence sending XITTs to the nodes at IDs 35 through 65 before successfully passing the token to node 66. The process continues through nodes 66, 142, 174, and 199 before the token loop is finally completed with an ITT to 245. The enhanced node 174 does not send any XTOKs because it has detected the previous enhanced activity of the XTOKs sent by node 35. Once the token loop is established, the token is passed only to nodes 7, 35, 66, 142, 174, 199 and 245. No attempts to pass the token to other nodes occur until the next reconfiguration sequence.

FIG. 13 shows the situation where both basic and enhanced nodes have IDs below 256, and enhanced nodes have IDs at 256 and above. In the FIG. 13 case the reconfiguration precedence timeout occurs at the basic node at ID 245. The token loop initialiation begins with the node at ID 245. Tokens (ITTs) are sent until the nodes at ID 7 and at ID 35, in that order, have been established as a part of the token loop. When the first enhanced node at ID 35, receives the token, it commences sending XTOKs. XTOKs are sent unsuccessfully to IDs 256 through 295, followed by a successful pass of the token to the enhanced node at ID 296, thereby establishing a direct token pass from a node below ID 256 to an enhanced node above ID 256. Node 296, of course, has recognized previous enhanced activity, since it has detected the previous XTOKs sent by node 35. Node 296 commences sending XTOKs from IDs 296 to 312 before passing the token successfully to node 313. Node 313 finds node 442, and 442 finds node 507 in a similar manner. Node 507, in this example, unsuccessfully sends XTOKs to IDs 508 through 2047; at which point, upon detection that the NID has reached its maximum value (2047), node 507 restores its NID to the basic ID of the previous basic node (PID) which previously successfully passed the token plus 1, i.e. PID+1 (which is ID 36 in this example). Node 507 commences sending XITTs starting at ID 36. All the enhanced nodes on the network monitor the PID value and have their PID registers set to the ID of the last basic node which successfully passed the token. The PID register of each enhanced node is not updated when token passes to addresses greater than 256 are detected.

The XITT transmissions to IDs 36 through 65 will, in this example, receive no response. When the XITT is successfully sent to node 66, the token returns to the basic range of permissible addresses. The further initialization of the token loop to nodes 142, 174, 199, 245 will take place in the basic manner, with the token loop being complete when the token returns to node 245. Again, node 174 does not attempt to send XTOKs, because it has previously detected enhanced activity. Until the next reconfiguration, the token is passed directly to the nodes 7, 35, 296, 313, 442, 507, 66, 142, 174, 199 and 245, in the token loop thus established.

FIG. 14 shows another case where both basic and enhanced nodes have IDs below 256 and other enhanced nodes have IDs at ID 256 and above. FIG. 14 is similar to FIG. 13 except that the reconfiguration precedence timeout occurs at enhanced node 251 rather than at a basic node. When an enhanced node with an ID less than or equal to 255 times out before any other node with an address in the basic range, the enhanced node immediately sets its NID equal to 256 and commences sending XTOKs to addresses in the enhanced range of permissible addresses. In this case, enhanced node 251 sends XTOKs to IDs 256 through 295 before a successful token pass occurs to node 296. Reconfiguration from node 296 to node 313 to node 442 to node 507 is equivalent to that in FIG. 13. Node 507 sends XTOKs to IDs 507 through 2047 and then resumes token passing with XITTs starting at PID+1. At this point PID is still 0 because it is initialized to 0 at the beginning of the reconfiguration sequence. Since no token passes below ID 256 have occurred up to this point, no updates of PID have occurred, so PID remains at 0. As a result, the sending of XITTs begins at basic ID 1 and proceeds to ID 6 with no response before an XITT to node 7 bridges the token loop back to the basic range of addresses. Node 7 will then send ITTs to find node 35. Node 35 will find node 66, etc., around through nodes 245 to 251. Enhanced nodes 35 and 174 have both detected previous enhanced activity and, therefore, restrict their reconfiguration activities to sending XITTs to the basic range of addresses starting at their own ID. Once the token returns to node 251, subsequent token loops will involve passing the token only to nodes 296, 313, 442, 507, 7, 35, 66, 142, 174, 199, 245 and 251, until the next network reconfiguration.

FIG. 15 represents the case of what is termed a composite token loop. In this case, there are only basic nodes at addresses in the basic range below ID 256, and there are only enhanced nodes in the enhanced range at ID 256 and above. As will be seen two reconfiguration precedence timeouts will occur before the token passing loop is completely established. The first node to time out will be the highest addressed node in the basic range of addresses, in this example basic node 245. Node 245 sends ITTs to IDs 245 through 255 and 0 through 6 with no response before establishing its NID at node 7. This is illustrated by a dashed line between nodes 245 and 7 because of the fact that this link in the token loop is only present until the second reconfiguration precedence timeout occurs, as discussed below. Nodes 7, 66, 142, and 199 in this example then proceed to establish a conventional ITT token loop of the type previously described only through the basic nodes.

The nodes above ID 256 will not detect any enhanced activity because there are no enhanced nodes at IDs below 256, so eventually the reconfiguration precedence timer of the lowest-addressed of the active enhanced nodes (in this example node 296) will time out. Node 296 sets a flag in a decode zero (DZ) register to indicate that this node is to respond to a token addressed to ID 0, checks a reconfiguration burst (RB) register to determine that a reconfiguration burst needs to be sent, and in response to these conditions sends a reconfiguration burst to destroy the token that is circulating only to the nodes in the basic range of addresses. Node 296 then commences sending XTOKs with its own ID, polling IDs 296 to 312 before a successful XTOK transmission to node 313 is achieved. Node 313 establishes node 442 in the token loop, and in turn node 442 establishes node 507 in the loop. Node 507 will detect no responses in sending XTOKs to IDs up to 2047, and then commences XITT polling at PID+1. PID+1 will be equal to 1 because PID was set to 0 when the node 296 sent the reconfiguration burst and destroyed token. Accordingly, XITT polling will begin at ID 1 and increment up to ID 6 before node 7 successfully responds to an XITT from node 507. The token loop will then be reinitialized between nodes 7, 66, 142, 199, and 245 in the standard manner. Node 245 will proceed to send ITTs to IDs 245 through 255 before the modulo-256 incrementation of NID results in an ITT to ID 0. The ITT to node 0 will be decoded by node 296 because node 296, which incurred the second reconfiguration precedence timeout, will have its decode zero (DZ) register set to recognize a response to a token addressed to ID 0. This token pass completes the token loop with the ID 0 pseudo-address, thereby completing closure of the composite token loop. The pseudo-address 0 is only detected by the lowest addressed active node in the enhanced range (node 296 in this example) and only for ITTs and XITTs.

A composite token loop is necessary because with only basic nodes below ID 256, no enhanced node is available in the basic range to send an XTOK directly to an enhanced node in the enhanced range of addresses. ID 0 is preferred for the pseudo-address because the use of any other ID value would use an address otherwise assignable to an actual node. Address 0 is acceptable for use as a token destination in the composite token loop, because no specific node may actually exist at that address, and because under the network operating protocol the use of address 0 for broadcasts applies only to the transmission of data packet frames and not to token frames. Accordingly the other nodes, except that enhanced node with its DZ register set, will not recognize a token pass to ID 0. Once the initialization of the token loop is completed when the token returns to node 296 after the timeout by node 296, subsequent token loops involve only the nine active nodes 296, 313, 442, 507, 7, 66, 142, 199 and 245, until the next network reconfiguration occurs.

FIG. 16 shows the case where only enhanced nodes exist on the network and all of them have addresses in the enhanced range. In this case, there is only one reconfiguration precedence timeout and that is by the lowest assigned enhanced node ID, in this case node 296. Node 296 sends XTOKs upward from its ID, and ultimately the token passing loop to nodes 313, 442, and 507 in the previously described manner. After node 507 accepts the token, it then sends XTOKs with no response up to ID 2047 and then commences sending an XITT to PID+1, which will be 1. Node 507 will continue to send unsuccessful XITTs to all IDs 1 through 255. The modulo-256 incrementation of NID will then result in an XITT to 0. Because node 296 incurred the original timeout, its DZ register will be set to respond to tokens addressed to ID 0, and node 296 will decode the node 0 psuedo-address, completing a token loop from 507 to 296 through pseudo-address 0. Once the initialization of the token loop is completed when the token returns to node 296, the token loop involves only the four active nodes 296, 313, 442 and 507, until the next network reconfiguration occurs.

An optimization to the FIG. 16 situation can be made, when deemed to be a sufficiently common case, to allow enhanced nodes to resume XTOK polling at ID 256 to complete the token loop totally with XTOKs, without consuming the added time during network reconfiguration to send the null XITTs to IDs 1 through 255 and without consuming the added time during network operation to send the XITT to 0, either of which will take longer than sending an XTOK directly from 507 to 296. The optimizing approach requires each enhanced node to determine that a XTOK has been unsuccessfully passed to ID 2047 when the RB register indicates that no reconfiguration burst has been sent. Under these conditions XTOK polling will resume at ID 256. This optimization approach adds complexity to the enhanced reconfiguration sequence shown in FIGS. 17A, 17B and 17C, described below. Ordinarily, networks having both enhanced and basic nodes below ID 256 will be far more common than networks with only nodes above ID 256, so the added complexity of the reconfiguration sequence will usually be unjustified.

Under very heavily loaded operating conditions, a basically configured LAN will pass the token with sufficient speed that the token will return to each node well before the lost token timer times out. The margin of extra time is sufficient so that the added enhanced nodes can also participate in network activities when the token loop is extended to include the added enhanced nodes. Under a worst case analysis when a maximum number of basic and enhanced nodes are active and each is communicating the maximum length messages, the lost token time out period of the nodes may need to be extended. In reality the worst case situation would virtually never occur, since a typical heavily loaded situation occurs when less than about 5% of the nodes are communicating messages. In any event, if the worst case situation did occur, a network reconfiguration would simply occur, and the probabilities are that, after reconfiguration, the worst case situation would have changed due to the dynamically changing use characteristics of the network. Another approach, rather than lengthening the lost token time out period, is to break one larger network into two or more smaller segments, since a network which incurs that much loading is generally an inefficient network.

The functionality of the enhanced reconfiguration sequence of the present invention is preferably achieved by means of the network protocol controller 70 (FIG. 4) in each enhanced node. Since the basic reconfiguration sequence of a basic node has been previously described in conjunction with FIG. 11, only the enhanced reconfiguration sequence associated with each enhanced node will be described below. The enhanced reconfiguration is interoperative with the basic reconfiguration sequence, so the protocol implemented by the link level protocol engine 58 (FIG. 3) of each basic node need not be modified in order to simultaneously accomodate the enhanced nodes in the enhanced range of addresses on a LAN.

The enhanced reconfiguration sequence begins, as is shown in FIG. 17A, in a similar manner to the normal reconfiguration sequence, with power-on reset (150) or the lost-token timer timeout (152) causing the transmission (154) of a RECON burst to terminate activity on the network and force a complete reconfiguration of the token loop. Each enhanced node then reads (156) its own ID, which in this case can be any value from 1 to 2047. The enhanced node then sets (158) several internal state variables to zero in similarly designated registers including: PID, the address of the previous basic node to hold the token; XA, a flag indicating whether or not any enhanced activity has been detected during this reconfiguration sequence, used to determine whether other enhanced nodes have received the token; and DZ, a flag which indicates whether this node is to decode token passes to network address 0, used to complete the token loop between basic nodes and enhanced nodes, as discussed above in conjunction with FIGS. 15 and 16. These initial state variables of zero indicate: that there is no valid basic node at which the token was last held (PID=0); that there has been no enhanced activity detected thus far during this reconfiguration sequence (XA=0); and that token passes to address 0 should not be decoded (DZ=0). The enhanced node then initializes its NID register to its own ID value. The capability table is then initialized (160) such that all IDs less than or equal to 255 are marked as being basic nodes and all IDs greater than 255 are marked as being enhanced nodes. The initial default conditions are thus established, which are assumed later in the sequence.

Process flow then bifurcates (162) based on whether this node has an assigned ID greater than 255 or less than or equal to 255. In the case where the ID is less than or equal to 255, meaning that the enhanced node is present in the basic range, the enhanced node must participate in a conventional token loop initialization, as well as providing the gateway to the enhanced range of addresses for other enhanced nodes if no other enhanced node has done so previously.

When the ID of the enhanced node is less than or equal to 255, the reconfiguration precedence timeout period (164) is the same (146 usec×(255−ID)) as for basic nodes. If network activity is detected (166) before the timeout expires (168), the receive sequence shown in FIG. 17C is entered. If this timeout expires (168) before any network activity is seen, the node timing out is the highest addressed active node below 256. This node, therefore, will start to establish the token loop.

If there are any enhanced nodes below ID 256, it is advantageous to have one of them pass the token to the lowest ID active enhanced node above ID 255 to both minimize the reconfiguration time and maximize the efficiency of the resulting token loop. This is accomplished in the preferred embodiment by having the first enhanced node to receive the token during the reconfiguration sequence commence passing tokens to the enhanced range of addresses, starting at ID 256. If the node which times out is an enhanced node, which is the example contemplated by FIG. 14, the token loop initialization begins by an attempted token pass to ID 256. So, when the first node in the basic range to timeout is an enhanced node, it sets (170) its NID to 256, sets (173) the XA flag to 1 to handle the case that this is the only enhanced node on the network, and enters the polling sequence, shown in FIG. 17B.

The polling sequence commences, as is shown in FIG. 17B, with looking up (172) the capabilities of the node at the next ID (NID) in the capability table. If the NID is that of an enhanced node, an XTOK is sent (174) to the NID. Of course, for addresses above 256, the capabilities are, by default, enhanced, as was established during initialization (160, FIG. 17A) of the capability table. The enhanced node sends (174) an XTOK to the NID, listens (176) for activity on the network medium within 78.4 microseconds, and if activity is detected, proceeds to the receive sequence shown in FIG. 17C to process the activity. If no activity is detected (176) within 78.4 microseconds, the NID is tested (178) to determine if it has reached 2047. If the NID has not reached 2047, which in the preferred embodiment is the highest allowable ID in the enhanced range of addresses, the NID is incremented (180) and the polling sequence is repeated.

If the NID has reached 2047, a test is then made (182) to determine how to resume polling for addresses below 256. This resumption is based on the assigned ID of this particular node. If the node has an ID less than or equal to 255, as is the case in FIG. 14, normal polling for basic addresses is entered by setting (184) NID equal to ID and commencing with the normal XITT polling (187). On the other hand, if the ID is greater than 255 (182), then the NID is set equal to PID plus 1 (186), and normal XITT polling commences (187) with NID equal to PID+1. If there has been no activity by basic nodes, PID will be equal to 0, so the token polling of the basic range of addresses will begin at ID 1. Otherwise polling of basic addresses will commence at the last polled basic address plus 1.

Token polling to basic nodes by an enhanced node is by sending XITTs (187). XITTs are sent after determining (172) that the NID is that of a basic node (or a node of unknown type) from the capability table. After sending (187) the XITT, a determination is made (188) whether activity is present on the network medium within 78.4 usec. If so, the receive sequence shown in FIG. 17C is entered. If not, the NID value is incremented (190) by 1, modulo 256, and the process flow (172, 187, 188) is repeated until the next active basic node is found. Whenever activity is detected (176, 188, FIG. 17B) after a token pass or while waiting for activity in the idle loop (192, FIG. 17C) during normal operation (described more completely in the application for LAN WITH INTEROPERATIVE MULTIPLE OPERATIONAL CAPABILITIES) the receive sequence shown in FIG. 17C is entered.

The first determination made (194) in the receive sequence (FIG. 17C) is whether the received frame is a basic frame or an enhanced frame. This determination is made by checking (194) the third symbol of the frame. If this symbol is equal to a non-standard inverse-phase dipulse or enhanced signal element as described above and more fully in the applications for LAN WITH INTEROPERATIVE MULTIPLE OPERATIONAL CAPABILITIES and MULTIBIT AMPLITUDE AND PHASE MODULATION TRANSCEIVER FOR LAN, an enhanced frame is indicated. The XA flag is set (196) equal to 1 to indicate that enhanced activity has been detected on the network since network reconfiguration began. Setting the XA flag equal to 1 will prevent the enhanced node where XA has been set to 1 from attempting to initiate token polling of addresses above 255. Next, the header of the enhanced frame is received and decoded (198). If the header of the enhanced frame does not indicate an XTOK, the frame is processed (200) in a manner appropriate for that frame-type in the enhanced protocol. Frames which are not tokens are not part of the reconfiguration sequence of this invention, but are discussed more fully in the first two previously mentioned applications. If the frame is an XTOK, the DID of the XTOK is saved (202), the XTOK flag field is decoded (204), the rate and status capabilities of the enhanced node sending the XTOK are recorded (206) in the capability table based on the value of PID, which identifies the node to last receive the token, and then it is determined (208) whether the saved DID is greater than 255. If not, PID is set (210) equal to the saved DID; if so, PID is not updated, and a determination is made (212) whether the XTOK is addressed to this node. If not, the sequence enters (214) the idle loop, ending the reconfiguration process, if any, for this node.

If the XTOK is addressed to this node (212), the XA flag is tested (216). If the XA flag is equal to 0, meaning that the token has been received by this node before any enhanced activity was detected or generated on the network, the node sets (170, FIG. 17A) NID equal to 256, sets (170) XA equal to 1 to prevent an infinite loop in the case that this is the only enhanced node on the network, and enters the XTOK polling sequence (FIG. 17B) for the enhanced range of addresses. If XA is equal to 1, then the sequence for receipt of the token for conventional network activity is entered. The sequence involves restarting (218) the lost-token timer, determining (220) if there is a pending transmission, and, if so, entering the transmit sequence (222), which involves sending the packet with any necessary inquiries and acknowledgements. After executing the transmit sequence (222), of after detecting (220) that there is no pending transmission, the token is passed (FIG. 17B) based on the currently established NID value.

If the third symbol test (194) during the receive sequence (FIG. 17C) determines that a basic frame is received (based on there being a normal-phase dipulse in the third symbol as described more fully in LAN WITH INTEROPERATIVE MULTIPLE OPERATIONAL CAPABILITIES and MULTIBIT AMPLITUDE AND PHASE MODULATION TRANSCEIVER FOR LAN), the basic header is received and decoded (224). One aspect of this decoding is that an ITT or XITT will be accepted not only when addressed to the assigned ID of this node, but also when addressed to ID 0, in the case where the DZ flag is equal to 1. If the incoming frame is neither an ITT or a XITT, then it is processed (226) in the manner for a basic type of frame. If the frame is either an ITT or a XITT, the DID is saved (228 or 230, respectively). In the case of an XITT the flags are decoded (232) and recorded (206) in the capability table at the PID. The saved DID is tested as being greater than 255 and, if not, PID is set (210) equal to the saved DID. On the path of a received ITT, the test (208) for the ID is not needed, because the ID cannot be greater than 255 in an ITT. In all cases, it is determined (212) if the token is addressed to this node. Of course, if the DZ flag is equal to 1 then tokens addressed to ID 0 are also treated as being addressed to this node. If the token is addressed to a different node, and exit is made to the idle loop (214). If the token is addressed (212) to this node, XA is tested (216) and processing proceeds as previously discussed.

At the bifurcation (162) following the initialization sequence (156, 158, 160), shown in FIG. 17A, the process flow for IDs greater than 255 begins. The RB flag is set (234) to 0. The RB flag is used in determining whether a supplemental reconfiguration burst is needed. The reconfiguration precedence timer is initialized (236), but, in this case, to a different value than for a basic node. The enhanced reconfiguration precedence timeout is set to 146 usec×ID rather than to 146 usec×(255−ID) for a basic node. This means that the timeouts for all enhanced nodes in the enhanced range of addresses are longer than any basic address timeouts, since the longest basic address timeout is 146 us×254 and the shortest enhanced address timeout is 146 us×256. Consequently the first enhanced node in the enhanced address range to time out will be the active node with the lowest assigned address greater than 255. For nodes in the basic address range the first timeout occurs at the active node with the highest assigned address less than or equal to 255.

Once the reconfiguration precedence timer has been started (236), two separate tests occur during an activity monitoring loop. If enhanced activity is detected (238), as determined by the third symbol of the frame, the reconfiguration timeout sequence is ended, because activity from an earlier timeout of an enhanced node has been detected. In this case entry is made to the receive sequence (FIG. 17C) immediately after the third symbol test (194) for processing of an enhanced frame. If basic activity is detected (240, FIG. 17A), the RB flag is set (242) to 1, but the reconfiguration precedence timeout sequence is not terminated. There is no need to decode this detected basic activity during network reconfiguration, since basic activity cannot pass the token to a node with an address greater than 255. The RB flag will only be equal to 1, at the time when the lowest-addressed active enhanced node above 255 times out, in the case where all active nodes below 256 are basic nodes, and, therefore, no enhanced node is available in the basic range of addresses to perform XTOK polling of IDs 256 and above.

If the reconfiguration precedence timer (236) times out (244) for a node above 255, this indicates that either no activity has been detected (238, 240) during the reconfiguration precedence timeout interval (236), or that only standard (basic) activity has been detected. In either of these cases, it will be necessary to create the composite token loop—where the last token pass connects back to enhanced nodes above ID 255 by a token pass to ID 0. To enable this last token pass in a composite token loop to ID 0, the DZ flag is set (246) to 1 to enable the enhanced node timing out to decode ITTs and XITTs addressed to ID 0. The RB flag is next tested (248). The RB flag will be 0 based on initialization and entry to this branch. If only basic activity and no enhanced activity has been detected (240, 238 respectively), RB will be set to 1. If RB is 1, a supplemental reconfiguration burst is sent (250) by this node to destroy any partial token loop which may exist at any nodes with IDs below 256. Otherwise, no reconfiguration burst is sent by this node. In either case this node then sets (252) NID=ID and enters the polling sequence (FIG. 17B) which, because the ID is greater than 255, will begin with the enhanced path by sending (174) XTOKs to successively higher addresses in the enhanced range.

When all of the active nodes below 256 are basic nodes, there is no enhanced node to initiate polling at ID 256 and above. The token in the token loop that has been established in the basic range of node addresses must be destroyed and, a complete token loop which includes the enhanced nodes in the enhanced address range must be generated, beginning with the lowest active enhanced address node and then proceeding up through successive enhanced address IDs up to 2047 and then back around through addresses below 256.

It is possible, although not likely, that the second reconfiguration precedence timeout in a composite token loop case analogous to FIG. 15 could occur in certain cases before the basic token loop segment through the basic range is fully established, based on the operational sequence shown in FIGS. 17A, 17B and 17C. In such a worst case situation of basic nodes below ID 256, the specified second reconfiguration precedence timeout period will expire first. No operational problem results because the consequences of this worst case will still result in proper network operation. Any token loop segment for nodes below ID 256, whether partially or fully initialized, will be destroyed by the supplemental reconfiguration burst in the process of establishing the composite token loop.

A worst case situation occurs when the only active nodes below 256 are at very low addresses and the first node to timeout is a basic node. For example, consider only two nodes below ID 256 at IDs 1 and 2, and enhanced nodes at IDs greater than 255, including one at ID 256. The node at ID 1 is an enhanced node, and the node at ID 2 is a basic node. The timeout at ID 2 will be 146×253 microseconds, which is only 3×146 microseconds before the timeout of the lowest possible node above ID 255—that of the node at ID 256. However, the token polling of IDs starting at ID 2 and going up through ID 255 will take nearly 20 milliseconds, which is much longer than the period before node 256 will time out because it sees only basic activity. Node 256 will generate the second reconfiguration burst and take over token loop initialization. Node 256, or some similarly low-addressed enhanced node, takes over token loop initialization by polling upward with XTOKs, thereby initializing a token loop through all enhanced nodes above 256. Since no enhanced activity was detected below ID 256, which would have averted the second timeout, the highest addressed active node in the enhanced address range commences XITT polling at ID 1, which will, ultimately, close the token loop through the active nodes in the basic address range. The enhanced activity in establishing the token loop above ID 255 will prevent XTOK polling by any enhanced nodes encountered in the basic address range and the token loop will finally be closed by the highest addressed node in the basic address range sending an ITT to ID 0 to create a composite token loop.

The network will initialize to a valid token loop even though there are cases where, had the initialization below 256 been allowed to complete, a bifurcation at an enhanced node would have prevented a need for the second reconfiguration burst. The process flow as shown in FIGS. 17A, 17B and 17C is an effective compromise between the possibility of taking even longer to initialize and the occasional spurious or unnecessary worst case creation of a composite token loop.

By making the timeout on the branch (162, FIG. 17A) for IDs greater than 255, equal to ID×146 us plus a constant (approximately 61 milliseconds for ARCNET to completely initialize in the basic address range), all possible worst case token loop initialization situations below ID 256 would take place, before any timeouts above ID 256 take place while still providing for the orderly establishment of a token loop for the enhanced nodes at IDs above 256. However, the constant (e.g. 61 ms) bias would significantly increase the time to reconfigure the network with either a composite token loop or with only nodes at IDs greater than 256 active on the network. Adding the constant bias would result in no substantial perceived benefit, since there is no functional disadvantage or operational requirement that requires the branch (162) for IDs greater than 255 to prevent the second timeout (236, 244) from ever preceding a timeout (164, 168) on the branch for IDs less than 256. Because of the use of XTOKs in the polling of addresses 256 to 2047, and the reduced turnaround time which is possible with the enhanced signaling technique, described more completely in LAN WITH DYNAMICALLY SELECTABLE MULTIPLE OPERATIONAL CAPABILITIES and LAN WITH INTEROPERATIVE MULTIPLE OPERATIONAL CAPABILITIES, the full polling of the enhanced address range takes only about 20½ milliseconds and overhead of about 37% is added to the time it takes to reconfigure in the non-composite token loop situation. Full polling of the enhanced address range is considerably shorter than a bias of 61 milliseconds. Of course, in the worst case composite token loop situation that can validly occur, as much as 300 milliseconds could be lost in timeouts. Therefore, a total reconfiguration time could get as high as about 380 milliseconds, which is considerably longer than the current ARCNET worst case of 61 milliseconds, but, since reconfigurations only occur when initializing or reinitializing the network, this is not an operational restriction that is likely to be noticeable to users.

The presently preferred embodiment of the present invention and its improvements have been described with a degree of particularity. It should be understood, however, that previous description has been made by way of preferred example and that the scope of the present invention is defined by the following claims.

What is claimed:

1. A directed token local area network (LAN), comprising:
   a plurality of at least three nodes, each node having a unique address or ID, at least one of the nodes being a basic node, all basic nodes having IDs which fall within a basic range of permissible IDs, at least one of the nodes being an enhanced node, each enhanced node having an ID which falls within an enhanced range of permissible IDs or within the basic range, all of the IDs in the enhanced range being greater than those permitted in the basic range, at least one of the enhanced nodes having an ID in the enhanced range; and
   reconfiguration means associated with all of the nodes and operative for passing tokens to locate the next active node and to establish automatically all of the active nodes in a token loop according to the IDs of the nodes to enable all of the active nodes to receive tokens during normal LAN operation, said reconfiguration means executing a standard reconfiguration sequence for locating and establishing all of the active nodes with IDs in the basic range in a sequence in a basic segment of the token loop, said reconfiguration means also executing an enhanced reconfiguration sequence for locating and establishing all of the active nodes with IDs in the enhanced range in a sequence in an enhanced segment of the token loop, the basic and enhanced segments defining the token loop, and the execution of the enhanced reconfiguration sequence commencing with the first enhanced node to receive the token in conjunction with execution of the basic reconfiguration sequence.

2. A LAN as defined in claim 1 wherein:
the execution of the enhanced reconfiguration sequence terminates with the last active node in the enhanced range passing the token to the ID of a node in the basic range.

3. A LAN as defined in claim 2 wherein:
the execution of the basic reconfiguration sequence commences upon the expiration of a predetermined time period established by the ID of an active node in the basic range.

4. A LAN as defined in claim 3 wherein:
all active enhanced nodes have IDs in the enhanced range; and
the execution of the enhanced reconfiguration sequence commences upon the expiration of a predetermined time period established by the ID of an active enhanced node in the enhanced range.

5. A LAN as defined in claim 4 wherein:
the predetermined time period established by the ID of an active enhanced node in the enhanced range is greater than the predetermined time period established by the ID of an active node in the basic range.

6. A LAN as defined in claim 2 wherein:
all active enhanced nodes have IDs in the enhanced range; and
the execution of the enhanced reconfiguration sequence commences upon the expiration of a predetermined time period established by the ID of one active node in the enhanced range.

7. A LAN as defined in claim 6 wherein:
the execution of the enhanced reconfiguration sequence commences with said one active enhanced node in the enhanced range; and
said one active enhanced node includes means for responding to a token pass to a predetermined ID of a node in the basic range to complete the token loop.

8. A LAN as defined in claims 2 wherein:
at least one active enhanced node has an ID in the basic range; and
the execution of the enhanced reconfiguration sequence begins upon receipt of a token by an active enhanced node in the basic range of addresses.

9. A LAN as defined in claim 8 wherein:
the execution of the basic reconfiguration sequence commences upon the expiration of a predetermined time period established by the ID of an active node in the basic range.

10. A LAN as defined in claim 2 wherein:
the token pass from the last active enhanced node in the enhanced range to the ID of a node in the basic range allows the basic reconfiguration sequence to be completed through the remaining active nodes in the basic range.

11. A LAN as defined in claim 1 wherein:
each enhanced node has at least one enhanced operational capability which all basic nodes do not have but which appears to basic nodes as basic LAN operational activity.

12. A LAN as defined in claim 1 wherein:
said reconfiguration means is distributed among all of the nodes.

13. A LAN as defined in claim 12 wherein:
said reconfiguration means which executes the enhanced reconfiguration sequence is present only at the enhanced nodes.

14. A LAN as defined in claim 13 wherein:
the reconfiguration means of each basic node transmits and responds to standard tokens (ITTs) during execution of the basic reconfiguration sequence; and the reconfiguration means of each enhanced node transmits one of either extended tokens (XITTs) or enhanced tokens (XTOKs) and responds to standard tokens, extended tokens or enhanced tokens during execution of the enhanced reconfiguration sequence.

15. A LAN as defined in claim 14 wherein:

the reconfiguration means of each basic node also responds to extended tokens during execution of the reconfiguration sequences.

16. A LAN as defined in claim 15 wherein:

communications between basic nodes and from basic nodes to enhanced nodes occur in accordance with a basic communication protocol; and communications between enhanced nodes and from enhanced nodes to basic nodes occur in accordance with an enhanced communication protocol, the enhanced protocol includes a first signalling scheme which is recognizeable only by enhanced nodes and a second signalling scheme which is recognizable by both enhanced and basic nodes.

17. A LAN as defined in claim 16 wherein:

each extended token contains signal elements which are recognizable in the basic and enhanced protocols and which contain additional signal elements which are transparent in the basic protocol but which convey information in the enhanced protocol.

18. A LAN as defined in claim 16 wherein:

each enhanced token contains signal elements which are recognizable only in the enhanced protocol and which are transparent in the basic protocol.

19. A LAN as defined in claims 1 or 15 wherein:

the execution of both the basic and enhanced reconfiguration sequences involves transmitting a token to an ID which is incremented relative to the ID of the node transmitting the token and recording the incremented ID as the next ID (NID) in the token loop upon sensing network activity created by the successful receipt and use of the token by the next active node.

20. A LAN as defined in claim 19 wherein:

the recorded incremented ID is that of the next active node in the reconfigured token loop.

21. A LAN as defined in claim 20 wherein:

after the token loop has been initially established, one of the basic and enhanced reconfiguration sequences are selectively executed upon a previously active node becoming inactive, by any single node transmitting a token to an incremented ID relative to the NID when the node at the previous NID becomes inactive and recording the new incremented NID upon sensing network activity associated with the successful receipt of the token at the next active node at the new NID.

22. A LAN as defined in claim 20 wherein:

the basic and enhanced reconfiguration sequences are executed at all of the nodes to establish a new token loop when a previously inactive node becomes active.

23. A LAN as defined in claim 1 wherein:

communications between enhanced nodes and from enhanced nodes to basic nodes occur in accordance with an enhanced communication protocol, the enhanced protocol includes a first signalling scheme which is recognizeable only by enhanced nodes and a second signalling scheme which is recognizable by both enhanced and basic nodes;

communications in both protocols involve transmitting frames of data, each data frame having an address field; and the address field in the basic frames has a size limitation which limits the maximum number of permissible nodes in the basic range.

24. A LAN as defined in claim 23 wherein:

the address field in the enhanced frames has a size limitation which limits the maximum number of nodes in the enhanced range to a number substantially greater than the maximum number of permissible nodes in the basic range.

25. A LAN as defined in claim 1 wherein:

at least one enhanced node with an ID in the enhanced range includes means for responding to a token addressed to a predetermined ID in the basic range in the token loop, said one enhanced node normally responding to data packet frame transmissions addressed to it at its ID in the extended range.

26. A LAN as defined in claim 25 wherein:

the predetermined ID in the basic range to which the means for responding to tokens of the one enhanced node responds, is available to designate broadcast data frames to all the nodes.

27. A LAN as defined in claim 26 wherein:

the predetermined ID designates broadcast data frames to all the nodes.

28. A method of reconfiguring a token loop of a directed token local area network (LAN) which comprises a plurality of at least three nodes, each node having a unique address or ID, at least one of the nodes being a basic node, all basic nodes having IDs which fall within a basic range of permissible IDs, at least one of the nodes being an enhanced node, each enhanced node having an ID which falls an enhanced range of permissible IDs or within the basic range, all of the IDs in the enhanced range being greater than those permitted in the basic range, at least one of the enhanced nodes having an ID in the enhanced range, and reconfiguration means associated with all of the nodes and operative for passing tokens to locate the next active node and to establish automatically all of the active nodes in a token loop according to the IDs of the nodes to enable all of the active nodes to receive tokens during normal LAN operation, said reconfiguring method comprising the steps of:

executing a standard reconfiguration sequence for locating and establishing all of the active nodes with IDs in the basic range in a sequence in a basic segment of the token loop;

executing an enhanced reconfiguration sequence for locating and establishing all of the active nodes with IDs in the enhanced range in a sequence in an enhanced segment of the token loop;

defining the token loop by the basic and enhanced segments; and commencing the execution of the enhanced reconfiguration sequence with the first enhanced node to receive the token in conjunction with execution of the basic reconfiguration sequence.

29. A method as defined in claim 28 further comprising:

terminating the execution of the enhanced reconfiguration sequence with the last active node in the enhanced range passing the token to the ID of a node in the basic range.

30. A method as defined in claim 29 further comprising:
commencing the execution of the basic reconfiguration sequence upon the expiration of a predetermined time period established by the ID of an active node in the basic range.

31. A method as defined in claim 30 wherein all active enhanced nodes have IDs in the enhanced range, and further comprising:
commencing the execution of the enhanced reconfiguration sequence upon the expiration of a predetermined time period established by the ID of an active enhanced node in the enhanced range.

32. A method as defined in claim 31 wherein the predetermined time period established by the ID of an active enhanced node in the enhanced range is greater than the predetermined time period established by the ID of an active node in the basic range.

33. A method as defined in claim 29 wherein all active enhanced nodes have IDs in the enhanced range, and further comprising:
commencing the execution of the enhanced reconfiguration sequence upon the expiration of a predetermined time period established by the ID of one active enhanced node in the enhanced range.

34. A method as defined in claim 33 further comprising:
commencing the execution of the enhanced reconfiguration sequence with said one active enhanced node in the enhanced range; and
completing the token loop by said one active enhanced node responding to a token pass to a predetermined ID of a node in the basic range.

35. A method as defined in claims 29 wherein at least one active enhanced node has an ID in the basic range, and further comprising:
beginning the execution of the enhanced reconfiguration sequence upon receipt of a token by an active enhanced node in the basic range of addresses.

36. A method as defined in claim 35 further comprising:
commencing the execution of the basic reconfiguration sequence upon the expiration of a predetermined time period established by the ID of an active node in the basic range.

37. A method as defined in claim 29 further comprising:
passing the token from the last active enhanced node in the enhanced range to the ID of a node in the basic range to allow completing of the basic reconfiguration sequence through the remaining active nodes in the basic range.

38. A method as defined in claim 28 further comprising:
providing each enhanced node with at least one enhanced operational capability which all basic nodes do not have but which appears to basic nodes as basic LAN operational activity.

39. A method as defined in claim 28 further comprising:
distributing one said reconfiguration means at each of the nodes.

40. A method as defined in claim 39 further comprising:
executing the enhnaced reconfiguration sequence only at the enhanced nodes.

41. A method as defined in claim 40 further comprising:
transmitting and responding to standard tokens (ITTs) during execution of the basic reconfiguration sequence at each basic node; and
transmitting one of either extended tokens (XITTs) or enhanced tokens (XTOKs) and responding to standard tokens, extended tokens or enhanced tokens during execution of the enhanced reconfiguration sequence at each enhanced node.

42. A method as defined in claim 41 further comprising:
responding to extended tokens during execution of the reconfiguration sequences at each basic node.

43. A method as defined in claim 42 further comprising:
communicating between basic nodes and from basic nodes to enhanced nodes in accordance with a basic communication protocol;
communicating between enhanced nodes and from enhanced nodes to basic nodes in accordance with an enhanced communication protocol; and
including in the enhanced protocol a first signalling scheme which is recognizeable only by enhanced nodes and a second signalling scheme which is recognizable by both enhanced and basic nodes.

44. A method as defined in claim 43 further comprising:
containing in each extended token, signal elements which are recognizable in the basic and enhanced protocols and additional signal elements which are transparent in the basic protocol but which convey information in the enhanced protocol.

45. A method as defined in claim 43 further comprising:
containing in each enhanced token, signal elements which are recognizable only in the enhanced protocol and which are transparent in the basic protocol.

46. A method as defined in claims 28 or 42 further comprising:
executing both the basic and enhanced reconfiguration sequences involves transmitting a token to an ID which is incremented relative to the ID of the node transmitting the token and recording the incremented ID as the next ID (NID) in the token loop upon sensing network activity created by the successful receipt and use of the token by the next active node.

47. A method as defined in claim 46 wherein the recorded incremented ID is that of the next active node in the reconfigured token loop.

48. A method as defined in claim 47 further comprising:
after intially establishing the token loop, selectively executing one of the basic and enhanced reconfiguration sequences upon a previously active node becoming inactive, by any single node transmitting a token to an incremented ID relative to the NID when the node at the previous NID becomes inactive and recording the new incremented NID upon sensing network activity associated with the successful receipt of the token at the next active node at the new NID.

49. A method as defined in claim 47 further comprising:
executing the basic and enhanced reconfiguration sequences at all of the nodes to establish a new token loop when a previously inactive node becomes active.

50. A method as defined in claim 28 further comprising:
communicating between enhanced nodes and from enhanced nodes to basic nodes occur in accordance with an enhanced communicating protocol;
including in the enhanced protocol a first signalling scheme which is recognizeable only be enhanced nodes and a second signalling scheme which is recognizable by both enhanced and basic nodes; and
communicating in both protocols by transmitting frames of data, each data frame having an address field, the address field in the basic frames having a size limitation which limits the maximum number of permissible nodes in the basic range.

51. A method as defined in claim 50 wherein the address field in the enhanced frames has a size limitation which limits the maximum number of nodes in the enhanced range to a number substantially greater than the maximum number of permissible nodes in the basic range.

52. A method as defined in claim 28 wherein at least one enhanced node with an ID in the enhanced range:
responding to a token addressed to a predetermined ID in the basic range in the token loop; and
normally responding to data packet frame transmissions addressed to said one enhanced node at its ID in the extended range.

53. A method as defined in claim 52 wherein the predetermined ID in the basic range to which the one enhanced node responds, is available to designate broadcast data frames to all the nodes.

54. A method as defined in claim 53 wherein the predetermined ID designates broadcast data frames to all the nodes.

* * * * *